(12) United States Patent
Wong et al.

(10) Patent No.: US 12,450,151 B1
(45) Date of Patent: Oct. 21, 2025

(54) SYSTEM AND METHOD FOR LARGE VOLUME DESIGN, BUILD, AND TEST

(71) Applicant: Form Energy, Inc., Somerville, MA (US)

(72) Inventors: Frank Wong, El Cerrito, CA (US); Anna Schneider, Oakland, CA (US); Scott Mackenzie, Berkeley, CA (US); Anushka Makhija, Bridgewater, NJ (US); Peter Vliet, San Francisco, CA (US); Jason Capili, San Francisco, CA (US); Henry Tareque, Arlington, MA (US); Rupak Chakraborty, Seattle, WA (US); Florian Wehner, Brookline, MA (US); Natalie Mako, Cambridge, MA (US); Adam Giusti, Newton, MA (US); Seth Feder, Cambridge, MA (US); Kristen Carlisle, Saugus, MA (US); John Challis, San Diego, CA (US); Konstantin S. Solnushkin, Yerevan (AM)

(73) Assignee: Form Energy, Inc., Somerville, MA (US)

( * ) Notice: Subject to any disclaimer, the term of this patent is extended or adjusted under 35 U.S.C. 154(b) by 273 days.

(21) Appl. No.: 18/360,440

(22) Filed: Jul. 27, 2023

Related U.S. Application Data

(60) Provisional application No. 63/392,843, filed on Jul. 27, 2022.

(51) Int. Cl.
G06F 11/3668 (2025.01)
G06F 8/71 (2018.01)
G06F 11/34 (2006.01)

(52) U.S. Cl.
CPC ............ *G06F 11/3688* (2013.01); *G06F 8/71* (2013.01); *G06F 11/3476* (2013.01)

(58) Field of Classification Search
CPC ..... G06F 8/71; G06F 11/3476; G06F 11/3688
See application file for complete search history.

(56) References Cited

U.S. PATENT DOCUMENTS

| 7,490,319 B2 * | 2/2009 | Blackwell | G06F 11/3698 717/124 |
| 7,840,944 B2 * | 11/2010 | Brunswig | G06F 11/3688 717/124 |
| 8,839,035 B1 * | 9/2014 | Dimitrovich | H04L 67/025 714/25 |

(Continued)

FOREIGN PATENT DOCUMENTS

CN 11598465 A 8/2020

*Primary Examiner* — Douglas M Slachta
(74) *Attorney, Agent, or Firm* — Clocktower Law LLC; Erik J. Heels; Michael A. Bartley

(57) ABSTRACT

Detailed herein are systems and methods for large volume design, building, and testing, particularly suited for rechargeable batteries intended for long duration energy storage. A specific item, such as a battery cell, may be designed through input and selection of various components and configurations, along with desired test protocols and configurations. A build team is notified of the new item, and confirms material and resources are ready to build the item. A specific channel is reserved or committed for the test. Test data, along with specifics and any errors or conditions encountered from specification through teardown, is tracked.

20 Claims, 57 Drawing Sheets

(56) References Cited

U.S. PATENT DOCUMENTS

| | | | |
|---|---|---|---|
| 8,856,594 B2* | 10/2014 | Kurapati | G06F 11/2294 |
| | | | 714/27 |
| 8,893,138 B2* | 11/2014 | Arnold | G06F 9/4881 |
| | | | 718/103 |
| 9,864,016 B2 | 1/2018 | Inguva et al. | |
| 10,135,936 B1* | 11/2018 | Venuraju | H04L 67/53 |
| 10,725,890 B1* | 7/2020 | Goyal | H04L 67/141 |
| 10,783,051 B2* | 9/2020 | Srinivasan | G06F 11/3688 |
| 11,068,384 B2* | 7/2021 | Zhang | G06F 9/466 |
| 11,237,217 B2 | 2/2022 | Velev et al. | |
| 11,366,746 B2* | 6/2022 | Bragg, Jr. | G06F 11/3688 |
| 11,391,778 B2 | 7/2022 | Zeier et al. | |
| 2008/0016396 A1* | 1/2008 | Higashi | G01R 31/318307 |
| | | | 714/30 |
| 2009/0307763 A1* | 12/2009 | Rawlins | G06F 11/2294 |
| | | | 714/E11.002 |
| 2018/0060066 A1* | 3/2018 | Rihani | G06F 8/71 |
| 2021/0105320 A1 | 4/2021 | Sayers | |
| 2021/0190873 A1 | 6/2021 | Jadwinski et al. | |
| 2021/0249702 A1 | 8/2021 | Murphy et al. | |

* cited by examiner

Channels

Viewing 500 | ▽ Filter | 🏷 Saved Filters | ↕ Sort: Channel ID | ≡ | ⚙ Default View

| POS ID | CHANNEL ID | CHANNEL STATUS | INFRA STATUS | EXP ID (RESERVED & ON TEST) | PROJECT | CELL ID | RESERVED CELL ID | READY OFF | CELL TYPE (RESERVED & ON) |
|---|---|---|---|---|---|---|---|---|---|
| -- | AC/DC01 ⊕ | ● Open | Commissioning | -- | -- | -- | -- | -- | -- |
| -- | AC/DC02 ⊕ | ● Open | Commissioning | -- | -- | -- | -- | -- | -- |
| LM-01-A-01 | Alderaan01 ⊕ | ● Open | Commissioning | -- | -- | -- | -- | -- | -- |
| LM-01-A-02 | Alderaan02 ⊕ | ● Open | Commissioning | -- | -- | -- | -- | -- | -- |
| LM-02-A-01 | Alderaan03 ⊕ | ● Open | Commissioning | -- | -- | -- | -- | -- | -- |
| LM-02-A-02 | Alderaan04 ⊕ | ● Open | Commissioning | -- | -- | -- | -- | -- | -- |
| LM-03-A-01 | Alderaan05 ⊕ | ● Open | Commissioning | -- | -- | -- | -- | -- | -- |
| LM-03-A-02 | Alderaan06 ⊕ | ● Open | Commissioning | -- | -- | -- | -- | -- | -- |
| LM-04-A-01 | Alderaan07 ⊕ | ● Open | Commissioning | -- | -- | -- | -- | -- | -- |
| LM-04-A-02 | Alderaan08 ⊕ | ● Open | Commissioning | -- | -- | -- | -- | -- | -- |
| LM-05-A-01 | Alderaan09 ⊕ | ● Open | Commissioning | -- | -- | -- | -- | -- | -- |
| LM-05-A-02 | Alderaan10 ⊕ | ● Open | Commissioning | -- | -- | -- | -- | -- | -- |
| LM-06-A-01 | Alderaan11 ⊕ | ● Open | Commissioning | -- | -- | -- | -- | -- | -- |

Shelf
Infra Status
Channel No.
Incubator Name
Incubator Bay
Pool
Temperature (°C)
Sets of Airlines
Water
Aux Channels
TC Channels
Tester Brand
Cathode Switching
$CO_2$ Scrubbing
Humidity Control
Hydrogen Monitoring
Aux Voltage Monitoring
EIS Functionality
Low Current Range (A) <=
High Current Range (A) <=

Save  Apply

FIG. 9

| SPECIFICATIONS | TEST | |
|---|---|---|
| Condition name * | Test | |
| Condition description | | |
| Cells with replicate conditio... * | 3 | |
| Cell type * | Sas: Reactor | ▶ |
| Cell assembly * | FSC: Cell | ▶ |
| Channel pool * | | ⊖ ▶ |
| Planned on-test date | mm/dd/yyyy | 📅 |
| Engineer build for all steps | Flag all | |
| Assign executor for all steps | | ▶ |

920 — Cells with replicate conditio...
900 — Cell type
910 — Cell assembly

FIG. 10

← Add test condition | EXP ID: 100123

1000

> New condition

| Overview | SPECIFICATIONS | |
|---|---|---|
| > Dry Build | Condition name* | |
| Anode subassembly | Condition description | |
| Counter electrode subass... | Cells with replicate conditions* | 3 |
| Reference electrode suba... | Cell type* 900 | Anode |
| Full Dry Assembly | Cell assembly* 910 | |
| > Fill | Engineer build for all steps | Flag all |
| Electrolyte production*** | Assign executor for all steps | |
| Filling | | |
| On-Test | | Next |
| During Test | | |
| Off-Test | | |
| Teardown | | |

← EXP ID: 100971　　　　　　　　　　⊟ Documentation

1100

Status: In Progress ⌄

EC 063 -　　　　Owner　Konstantin Solnushkin ⌄　｜Total Cells　0
　　　　　　　　Project　　　　　　　　　　　　　　｜Commit Date　--

Cells　　　　　　　　　　　　　　　　　　　　　　　　Add Condition ⌄

FIG. 11

← Edit test condition    EXP ID: 103869                                                    Save   Apply   ×

∨ Sas: Reactor-P... ⑩ ⊕ | On-Test |

| | |
|---|---|
| Overview | |
| ∨ Dry Build | |
|   GDE subassembly | SOP link | ▤ SOP |
|   OEE subassembly | Quality Checks link | ▤ Link |
|   Anode subassembly | EIS Testing - Beginning of Life | ☐ |
|   Separator subassembly | Special Cycler Needs | |
|   Reference electrode suba... | Special Test Needs | |
|   Reference electrode suba... | Standard Platform Link | ▤ Link |
|   Reference electrode suba... | Cycling protocol ID*  1200 | |
|   Full Dry Assembly | Air flow rate setpoint (sccm) | 50 |
| ∨ Fill | Temperature setpoint (deg C) | 30 |
|   Electrolyte production*** | Adapter cable type | CAB-62 or CAB-... ▸ |
|   Filling | Aux Channels | |
| On-Test | Cell Level Temperature Monit... | |
| During Test | CO2 Scrubbing | ☑ |
| Off-Test | Humidity Control | ☐ |
| Teardown | Tester Brand | ▸ |

☐ My Cells

Date Specified: [📅] to [📅]

Date Committed: [📅] 2023-05-02 × to [📅] 2023-05-13 ×

Date On-Test: [📅] to [📅]

Cell ID: ▸

Exp ID: (EXP100985 ×) (EXP100383 ×) ◂

Project:
☐ EXP100045
☑ EXP100985
☐ EXP101369
☐ EXP101377
☐ EXP101381
☑ EXP101383
☐ EXP101385
☐ EXP101397
☐ EXP101399

Engineer Build

SOP Deviation

⊕ Add Filter

Reset

| | CELL ID | CONDITION | EXP OWNER | PROJECT | CELL ASSEMBLY TYPE | ELECTROLYTE ID | DATE SPECIFIED |
|---|---|---|---|---|---|---|---|
| ☐ | ˅ Exp ID: EXP100123 | | | | | | |
| ☐ | › CEL000117 +1 EXP100123 | | | | | | |
| ☑ | ˅ Exp ID: EXP100039 | | | | | | |
| ☑ | › CEL000116 EXP100039 Peg2 | | | | | ICM100456 | 2021-0407 |
| ☑ | › CEL000127 EXP100039 Peg2 | | | | | ICM100456 | 2021-0407 |

All Experiments  All Cells  Specified (16)  Staged (16)  Committed (6)  Testing + (1)

Filter ⊘ ✕   Saved Filters   ↑ Sort: Exp ID   ≡   Conditions: 1  Cells: 2   Stage Selected   Commit Selected

1700

— CEL000116 EXP100039 Peg2 · · · ICM100346 · · · 2021-04-15

FIG. 17

| All Experiments | All Cells | Specified | Staged | Committed | Testing + | | | | |
|---|---|---|---|---|---|---|---|---|---|

Channels usage Summary

| BUILD TYPE COUNT | | ELECTROLYTE VOLUME BY ID | ANODE MASS BY ID | | OEE COUNT BY ID | |
|---|---|---|---|---|---|---|
| PEG02 | 2 | | | | ICM100879 | 2 |

Conditions: 1  Cells: 2    [Unstage] [Commit]

Reserve channels
Skip channel reservation
Clear Reservation — 1800

▽ Filter  ☰ Saved Filters  ↕ Sort: Exp ID  ↓  ⚙ Default View

| | CELL ID | EXP ID ↓ | CONDITION NAME | EXP OWNER | PROJECT | STATUS | PRIORITY | CELL |
|---|---|---|---|---|---|---|---|---|
| ☐ | ∨ Exp iD: EXP103051 | | (6 cells) | | | | | |
| ☐ | > CEL113231 + 1 | EXP103051 | | | | Staged | ① | PEG03 |
| ☐ | > CEL113229 + 1 | EXP103051 | | | | Staged | ① | PEG03 |
| ☐ | > CEL113221 + 1 | EXP103051 | | | | Staged | ① | PEG03 |
| ☐ | ∨ Exp iD: EXP103045 | | (2 cells) | | | | | |
| ☑ | > CEL113275 + 1 | EXP103045 | Trial1 | | | Staged | ③ | PEG02 |

FIG. 18

Reserve Channels

All channels listed for reservation are available and match cell conditions such as Cell temperature, Tester brand, Temperature monitoring status, Aux voltage, CO2 scrubbing, Thermocouple Level abd Hydrogen generation monitoring.

Channel distribution settings ^

| Incubators | Order | Other options |
| --- | --- | --- |
| Across Incubators ◯ | Consecutive ◯ | Use channels from other pools ◯ |

Reset    Assign channels (243 available)

| | CELL ID 113275 | CELL ID 113276 |
| --- | --- | --- |
| | ga... | Ganymede59 ▸ |
| | Ganymede46 | |
| | Ganymede47 | |
| | Ganymede48 | |
| | Ganymede49 (reserved) | |
| | Ganymede50 (reserved) | |
| | Ganymede51 | |
| | Ganymede52 | |
| | Ganymede53 | |
| | Ganymede54 | |
| | ☐ Match cell condition | |

| RESERVED CHANNEL ID | | |
| --- | --- | --- |
| POOL | | |
| TEMPERATURE (°C) | | |
| AIRLINES | | |
| WATER | | |
| AUX CHANNELS | | |
| TC CHANNELS | | |
| CATHODE SWITCHING | | |
| CO2 SCRUBBING | | |
| HUMIDITY CONTROL | | |
| TESTER BRAND | | |
| LOW CURRENT RANGE (A) <= | | |
| HIGH CURRENT RANGE (A) >= | 10A | |

FIG. 19

| ☐ Filter | 🗐 Saved Filters | ↑↓ Sort: Exp ID | ≡ | | Conditions: 1  Cells: 3 | | Commit Selected |
|---|---|---|---|---|---|---|---|
| | CELL ID | EXP ID ↓ | CONDITION | EXP OWNER | PROJECT | CELL ASSEMBLY TYPE | ELECTROLYTE ID | DATE STAGED |
| ☐ | ∨ Exp ID: EXP102636 | | | | | | | |
| ☐ | > CEL100171 | EXP102636 | Low | | | | ICM100101 | 2021-04-27 |
| ☑ | CEL000039 | EXP102636 | High-Concentration | | | | ICM100023 | 2021-04-09 |
| ☑ | CEL000041 | EXP102636 | High-Concentration | | | | ICM100023 | 2021-04-09 |
| ☑ | CEL000119 | EXP102636 | High-Concentration | | | | ICM100023 | 2021-04-12 |
| ☐ | ∨ Exp ID: EXP100456 | | | | | | | |
| ☐ | CEL000044 | EXP100456 | | | | Pegasus | | 2021-04-21 |

| POS ID | CHANNEL ID ↑ | CHANNEL STATUS | INFRA STATUS | EXP ID (RESERVED & ON TEST) | PROJECT | CELL ID | RESERVED CELL ID | READY OFF | CELL TYPE (RESERVED & ON TEST) | CELL ASSEM |
|---|---|---|---|---|---|---|---|---|---|---|
| ☐ CD-01-A-01 | Ananke01 | ● In Use | Online | EXP102931 | | CEL114037 | -- | | Sas: Reactor | PEG01 |
| ☐ CD-01-A-02 | Ananke02 | ● In Use | Online | EXP103050 | | CEL113933 | -- | | Sas: Reactor | PEG03 |
| ☐ CD-01-A-03 | Ananke03 | ● In Use | Online | EXP102896 | | CEL111870 | -- | | Sas: Reactor | PEG02 |
| ☐ CD-01-A-04 | Ananke04 | ● In Use | Online | EXP103140 | | CEL114220 | -- | | Sas: Reactor | PEG03 |
| ☐ CD-01-A-05 | Ananke05 | ● In Use | Online | EXP103107 | | CEL113853 | -- | | Sas: Reactor | PEG03 |
| ☐ CD-01-A-06 | Ananke06 | ● In Use | Online | EXP103050 | | CEL113934 | -- | | Sas: Reactor | PEG03 |
| ☐ CD-01-A-07 | Ananke07 | ● In Use | Online | EXP103050 | | CEL113935 | -- | | Sas: Reactor | PEG03 |
| ☐ CD-01-A-08 | Ananke08 | ● In Use | Online | EXP102896 | | CEL111875 | -- | | Sas: Reactor | PEG02 |
| ☐ CD-01-A-12 | Ananke12 | ● In Use | Online | EXP103090 | | CEL113564 | -- | | Sas: Reactor | PEG01 |
| ☐ CD-01-B-01 | Ananke13 | ● In Use | Online | EXP102894 | | CEL112286 | -- | | Sas: Reactor | PEG01 |
| ☐ CD-01-B-02 | Ananke14 | ● In Use | Online | EXP102894 | | CEL112287 | -- | | Sas: Reactor | PEG01 |
| ☐ CD-01-B-03 | Ananke15 | ● In Use | Online | EXP102894 | | CEL112288 | -- | | Sas: Reactor | PEG01 |
| ☐ CD-01-B-04 | Ananke16 | ● In Use | Online | EXP102894 | | CEL112289 | -- | | Sas: Reactor | PEG01 |
| ☐ CD-01-B-05 | Ananke17 | ● In Use | Online | EXP102894 | | CEL112292 | -- | | Sas: Reactor | PEG01 |
| ☐ CD-01-B-07 | Ananke19 | ● In Use | Online | EXP103051 | | CEL113265 | -- | | Sas: Reactor | PEG03 |
| ☐ CD-01-B-08 | Ananke20 | ● In Use | Online | EXP103015 | | CEL113155 | -- | | Sas: Reactor | PEG03 |
| ☐ CD-01-B-10 | Ananke22 | ● In Use | Online | EXP102954 | | CEL112473 | -- | | Sas: Reactor | PEG02 |
| ☐ CD-01-B-11 | Ananke23 | ● In Use | Online | EXP102954 | | CEL112474 | -- | | Sas: Reactor | PEG02 |

| | POS ID | Shelf | Infra Status | Channel No. | Incubator Name | Incubator Bay | Pool | Temperature (°C) | Sets of Airlines | Water | Aux Channels | TC Channels | Tester Brand | Cathode Switching | CO2 Scrubbing | Humidity Control | Hydrogen Monitoring | Aux Voltage Monitoring | EIS Functionality | Low Current Range (A) <= | High Current Range (A) >= | Min Voltage (V) <= | Max Voltage (V) >= | Cell Compatibility | Exp ID (Reserved & On Test) | Project | Exp Owner | CELL ID | RESERVED READY OFF CELL ID | CELL TYPE (RESERVED & ON TEST) | CELL ASSEM |
|---|---|---|---|---|---|---|---|---|---|---|---|---|---|---|---|---|---|---|---|---|---|---|---|---|---|---|---|---|---|---|---|
| ☐ | CD-01-A | | | | | | | | | | | | | | | | | | | | | | | | | | | L114037 | -- | Sas: Reactor | PEG01 |
| ☐ | CD-01-A | | | | | | | | | | | | | | | | | | | | | | | | | | | L113953 | -- | Sas: Reactor | PEG03 |
| ☐ | CD-01-A | | | | | | | | | | | | | | | | | | | | | | | | | | | L111870 | -- | Sas: Reactor | PEG02 |
| ☐ | CD-01-A | | | | | | | | | | | | | | | | | | | | | | | | | | | L114220 | -- | Sas: Reactor | PEG03 |
| ☐ | CD-01-A | | | | | | | | | | | | | | | | | | | | | | | | | | | L113853 | -- | Sas: Reactor | PEG03 |
| ☐ | CD-01-A | | | | | | | | | | | | | | | | | | | | | | | | | | | L113934 | -- | Sas: Reactor | PEG03 |
| ☐ | CD-01-A | | | | | | | | | | | | | | | | | | | | | | | | | | | L113935 | -- | Sas: Reactor | PEG02 |
| ☐ | CD-01-B | | | | | | | | | | | | | | | | | | | | | | | | | | | L111875 | -- | Sas: Reactor | PEG03 |
| ☐ | CD-01-B | | | | | | | | | | | | | | | | | | | | | | | | | | | L113564 | -- | Sas: Reactor | PEG01 |
| ☐ | CD-01-B | | | | | | | | | | | | | | | | | | | | | | | | | | | L112286 | -- | Sas: Reactor | PEG01 |
| ☐ | CD-01-B | | | | | | | | | | | | | | | | | | | | | | | | | | | L112287 | -- | Sas: Reactor | PEG01 |
| ☐ | CD-01-B | | | | | | | | | | | | | | | | | | | | | | | | | | | L112288 | -- | Sas: Reactor | PEG01 |
| ☐ | CD-01-B | | | | | | | | | | | | | | | | | | | | | | | | | | | L112289 | -- | Sas: Reactor | PEG01 |
| ☐ | CD-01-B | | | | | | | | | | | | | | | | | | | | | | | | | | | L112292 | -- | Sas: Reactor | PEG03 |
| ☐ | CD-01-B | | | | | | | | | | | | | | | | | | | | | | | | | | Online | L113265 | -- | Sas: Reactor | PEG03 |
| ☐ | CD-01-B-1 | | | | | | | | | | | | | | | | | | | | | | | | EXP102954 | | | CEL112473 | -- | Sas: Reactor | PEG02 |
| ☐ | CD-01-B-1 | | | | | | | | | | | | | | | | | | | | | | | | EXP102954 | | Online | CEL112474 | -- | Sas: Reactor | PEG02 |

> EXP: 103122 - MON ... 05 | Anode subassembly | Preferred executor: Engineer Name ▼

Overview

> Active Material Prep

Additive weight (&)
  2.3

HCA

△ Deviations from SOP
  Deviation Description

> Dry Build

Active Material
  GDE subassembly
  OEF subassembly
  Anode subassembly
  Separator subassembly
  Reference electrode suba...
  Full Dry Assembly △

| METADATA NAME | SPECIFIED VALUE | CELL ID 114546 |
|---|---|---|
| Anode Subassembly PartNo | | |
| Anode Subassembly Rev | | |
| Anode Mass Actual (Total) | | |
| Anode Mass Actual (g) | | 86.46 |

| EXECUTOR | ACTIONS | CELL ID 114546 |
|---|---|---|
| Will Heim ▼ | ▸ Mark all complete | ☑ |

> Fill

Electrolyte production***

| CONDITION NAME | EXP OWNER | DATE COMMITTED | PROJECT | STATUS | PRIORITY | ON TEST | CEL |
|---|---|---|---|---|---|---|---|
| | | 2022-03-30 | COTS OEE testing | Committed | 3 | ▲ 2800 | ARI |

FIG. 28

GDE subassembly

| AUTO-FILL DEFAULTS | SUBASSEMBLY PART NO | SUBASSEMBLY REV | GDE ICM/PCM |
|---|---|---|---|
| Fill defaults | 00001686-00 | 6 | 00034841-00REV01 |
| Fill defaults | 0000016... | | ...842-00REV01 |

| | |
|---|---|
| SOP link | First User<br>FirstUser@formenergy.com |
| | Second User<br>SecondUser@formenergy.com |
| Subassembly PartNo / Rev | Third User<br>ThirdUser@formenergy.com |
| GDE ICM/PCM | Fourth User<br>FourthUser@formenergy.com |
| GDE ICM/PCM Lot # | Fifth User<br>FifthUser@formenergy.com |
| Non standard | Sixth User<br>SixthUser@formenergy.com |
| Engineer build flag | SeventhUser<br>SeventhUser@formenergy.com |
| Preferred executor | |

| ← Specifications and metadata | | | 👥 Add samples for characterization | ⓘ Log Event | 🖉 | 🗐 | Save | ✕ |

EXP: 103908 - Nant +... ⓘ

Active Material

📄 SOP Document

OEE ICM/PCM
00010063-00REV01

> Overview
> Dry Build
  - OEE subassembly
  - Active Material
  - Counter electrode suba...
  - Reference electrode su...
  - Full Dry Assembly
> Fill
  ⚠ Electrolyte production***
  ⚠ Filling
  On-Test
  During Test
  Off-Test
  Teardown

|  |  | 3210 | 3200 |
|---|---|---|---|
| METADATA NAME | SPECIFIED VALUE | CELL ID 123668 |  |
| OEE Subassembly PartNo | 10001187 | 10001187 |  |
| OEE Subassembly Rev | 2 | 2 |  |
| OEE ID / ICM / PCM Lot #* | n/a | 00010063-00REV01 |  |
| OEE Mass Actual (g)* |  | 0 |  |
| OEE Mass Actual (rep2) (g)* |  | 0 |  |
| OEE Mass Actual (rep3) (g)* |  | 0 |  |
| OEE Active Area (cm^2) |  | 4 |  |

| EXECUTOR | ACTIONS | CELL ID 100221 |
|---|---|---|
| ▸ | Mark all complete | ⓘ ? Undo Edit |

Counter electrode subassembly

Teardown — 3500

← Specifications and metadata

EXP. 102879 - New teardo...

- Overview
- Dry Build
  - Anode subassembly
  - Counter electrode suba...
  - Reference electrode su...
  - Full Dry Assembly
- Fill
  - Electrolyte production*...
  - Filling
- On-Test
- During Test
- Off-Test
- Teardown

During Test

EOL Cell Quality Checks

METADATA NAME
- Anode Current Collector to Anode Current Collector R... — CELL ID 111445
- Anode Current Collector to Anode Voltage (V)

EXECUTOR — CELL ID 111446

3510 — Teardown
Cell ID: CEL11445    Type: Light

Teardown notes

Sludge depth (mm)*

"Dry" bed resistance (mΩ)*

Bed resistance in electrolyte (mΩ)

Marble strength, Mush (present, not present, couldn't open anode)*
Present

Marble strength, Crumbles (present, not present, couldn't open anode)*
Present

Marble strength, Does not crumble (present, not present, couldn't open anode)*
Present Marble strength, Sintered (present, not present, couldn't open anode)*
Present Undo | Edit Discard

FIG. 36

| RESERVED CHANNEL ID | CELL ID 114875 ▸ |
|---|---|
| POOL | — |
| TEMPERATURE (°C) | — |
| SETS OF AIRLINES | — |
| AUX CHANNELS | — |
| TC CHANNELS | — |
| CATHODE SWITCHING | NA |
| CO2 SCRUBBING | NA |
| HUMIDITY CONTROL | NA |
| TESTER BRAND | — |
| LOW CURRENT RANGE (A) <= | — |
| HIGH CURRENT RANGE (A) >= | — |
| MIN VOLTAGE (V) <= | — |
| MAX VOLTAGE (V) >= | — |
| HYDROGEN MONITORING | NA |
| AUX VOLTAGE MONITORING | NA |
| EIS FUNCTIONALITY | NA |
| TEST VEHICLES | |

Reset        Cancel     Reserve channels

| RESERVED CHANNEL ID | CELL ID 114875 ▲ | | |
|---|---|---|---|
| | Channel attributes to match with cell | | |
| POOL | Temperature | | Any ▾ |
| TEMPERATURE (°C) | Sets of Airlines | | Any ▾ |
| SETS OF AIRLINES | TC Channels | Yes | Any No |
| AUX CHANNELS | Cathode Switching | Yes | Any No |
| TC CHANNELS | CO2 Scrubbing | Yes | Any No |
| CATHODE SWITCHING | Humidity Control | Yes | Any No |
| CO2 SCRUBBING | | | |
| HUMIDITY CONTROL | Reset | Cancel | Apply |
| TESTER BRAND | | | |

| CELL ID 114875 | |
|---|---|
| RESERVED CHANNEL ID | gl |
| POOL | Ganymede38 (reserved) |
| TEMPERATURE (°C) | Ganymede53 (reserved) |
| SETS OF AIRLINES | Ganymede55 (reserved) |
| AUX CHANNELS | Ganymede57 (reserved) |
| TC CHANNELS | Ganymede02 (reserved) |
| CATHODE SWITCHING | Ganymede04 (reserved) |
| CO2 SCRUBBING | Ganymede05 (reserved) |

| ← Specifications and metadata | | | ⊕ Add samples for characterization | | ⊕ Log Event | | | × |
|---|---|---|---|---|---|---|---|---|
| EXP: 103192 - | OEE subassembly | | | | | | Save | |

Overview
> Dry Build
  GDE subassembly
  OEE subassembly ⚠
  Reference electrode su... ⚠
  Full Dry Assembly
> Fill
  Electrolyte production* ⊙
  ☐ Filling
  ☐ On-Test
  During Test
  Off-Test
  Teardown

| Subassembly PartNo / Revision | OEE ICM/PCM |
|---|---|
| 100361-B | ICM101190 |

⚠ Deviations from SOP

Deviation type

4100 ⟶ SPECIFIED VALUE

| METADATA NAME | SPECIFIED VALUE | CELL ID 114655 | CELL ID 114656 | CELL ID 114657 |
|---|---|---|---|---|
| OEE ICM/PCM Lot # | | | | |
| OEE Mass Actual (rep1) (g) | | | | |
| OEE Mass Actual (rep2) (g) | | | | |
| OEE Mass Actual (rep3) (g) | | | | |
| OEE Area Actual (cm^2) | | 26.67 | 26.67 | 26.67 |

| EXECUTOR | ACTIONS | | | |
|---|---|---|---|---|
| | ▸ Mark all complete | ☑ | ☑ | ☑ |

Reference electrode subassembly, GDE

Log Note    ✕

Cell IDs*
[ Cell14655 ✕ | ▸✕ ]

Notes*
[                    ]
4200

Tags
[                    ]

Alert the following:
[              ▸ ]

[📷] Attach photo
4210

[Submit]

Calibration voltage measurement

Electrode type*

Calibration Voltage (volts)*

Reference Voltage Assumed, Not Measured

Date measured*
2023-06-15

Time measured*
18:03:51

Submit

Off-Test

EoL Cell Quality Checks

| METADATA NAME | SPECIFIED VALUE | CELL ID 114877 VIEW EVENTS |
|---|---|---|
| EIS Testing - EoL | — | |

| EXECUTOR | ACTIONS | CELL ID 114877 VIEW EVENTS |
|---|---|---|
| ▶ | Mark all complete | ⊘ >    Undo \| Edit |

Teardown — 4700

Cell ID: CEL114877    Type: Light

Teardown Operators*

Date Teardown Started*

Electrolyte color*

Date Cell Opened for Teardown*

Save   Complete

Teardown

Note: There are updated teardown templates available for this assembly type. Click below to apply the updates.

Apply Teardown Template Updates — 5100

| METADATA NAME | SPECIFIED VALUE | CELL ID 114373 |
|---|---|---|
| Teardown Type* | | Discard |
| | | Update teardown flag specs |

| EXECUTOR | | CELL ID 114373 |
|---|---|---|
| | | Teardown |

FIG. 51

LOG EVENT

Bins*

Title*

Description*

Step Number

Cell ID(s)*
CEL114878 ✕

Experiment ID(s)*
Owner(s):
EXP103164 ✕

Channel ID(s)*

Event Summary

Cleaned out outlet bubbler tank

Status: Completed
Initial Bin: Infrastructure Event
Final Bin: Infrastructure Event -> Air Supply -> Other
Date Logged: Fri 09/09/22 at 13:00:04 UTC
Date Resolved: Fri 09/09/22 at 14:13:05 UTC
Cycle Number: -

Rotameter <40ml/min

Status: Completed
Initial Bin: Infrastructure Event
Final Bin: Infrastructure Event -> Air Supply -> Rotameter
Date Logged: Mon 08/08/22 at 17:38:50 UTC
Date Resolved: Mon 08/08/22 at 17:40:39 UTC
Cycle Number: -

Rotameters <40ml/min

Status: Completed
Initial Bin: Other
Final Bin: Other
Date Logged: Wed 08/03/22 at 15:00:51 UTC
Date Resolved: Wed 08/03/22 at 15:02:34 UTC
Cycle Number: -

FIG. 53

Create multiple characterization samples
Fill in shared sample data from 3 cells Modify cells

| | |
|---|---|
| Sample Type* | Electrolyte ▸ |
| DESCRIPTION | |
| Date sample harvested | 5/26/2023 📅 |
| Quantity | 30   mL |
| Air sensitive? | ☐ ▸ |
| Prior sample name | ▸ |
| Physical sample form | |
| Electrolyte PCM | ▸ |
| Part/ICM/PCM lot # | |
| Electrolyte state | ▸ |
| Precipitates? | ☐ |
| Sample owner(s) | ▸ |

Fill in data for 3 samples

FIG. 55

← Add samples for characterization

| | 5600A CEL114655 | 5600B CEL114656 | 5600C CEL114657 |
|---|---|---|---|
| Sample Type* | Electrolyte ▸ | Electrolyte ▸ | Electrolyte ▸ |
| DESCRIPTION | | | |
| Date sample harvested | 5/26/2023 🗓 | 5/26/2023 🗓 | 5/26/2023 🗓 |
| Quantity | 30 mL | 30 mL | 30 mL |
| Air sensitive? | ☑ | ☐ | ☐ |
| Prior sample name | ▸ | ▸ | ▸ |
| Physical sample form | ▸ | ▸ | ▸ |
| Electrolyte PCM | | | |
| Part/ICM/PCM lot # | ▸ | ▸ | ▸ |
| Electrolyte state | ▸ | ▸ | ▸ |
| Precipitates? | ☐ | ☐ | ☑ |
| Sample owner(s) | ▸ | ▸ | ▸ |

FIG. 56

SYSTEM AND METHOD FOR LARGE VOLUME DESIGN, BUILD, AND TEST

CROSS-REFERENCE TO RELATED APPLICATIONS

This utility patent application claims priority from U.S. provisional patent application Ser. No. 63/392,843, filed Jul. 27, 2022, titled "System and Method For Large Volume Design, Build, and Test", and naming inventors Rupak Chakraborty, Frank Wong, Anna Schneider, and Scott MacKenzie.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2023, Form Energy, Inc.

BACKGROUND

Field of Technology

This relates to methods and systems managing design, build, and test pipelines, and more specifically to large volume design, build, and testing of rechargeable batteries.

Background

There exist solutions to test batteries that work well for a small volume. An engineer can design a battery, build it, and test within chambers such as battery cyclers designed to test the charging and discharge of batteries under test. Battery cyclers are available in different configurations which affect their testing capabilities and the number of batteries able to be tested simultaneously. Typical examples include a single or double digit number of channels, with test controls designed to manage testing within a single battery cycler. A control unit is typically built into or directly connected to the battery cycler.

U.S. Pat. No. 11,237,217 (issued 2022 Feb. 1, naming inventors Velev et al., titled "Battery cell full life tracking system") discloses, in the Abstract, "Certain embodiments are described that provide a method and computer readable media for testing battery cells. A unique identifier (e.g., barcode) is affixed to a battery cell which allows it to be tracked across separate tests as a cell, in a module, string, pack, etc. Using a GUI, the unique identifier is recorded in a database along with at least a battery cell manufacturer and a battery cell model. A designation of the particular tester channel or module or string location is entered into the database in association with the unique identifier. Test results of the first test are electronically transferred from the first tester to the database along with the corresponding channel designations."

U.S. Pat. No. 9,864,016 (issued 2018 Jan. 9, naming inventors INGUVA et al., titled "Battery system pack life estimation systems and methods") discloses, in the Abstract, "System and methods for estimating a life of a battery pack are presented. In certain embodiments, a method for estimating a life of a battery pack may include generating cell-level test data that includes measured parameters a of battery cell included in the battery pack in response to a plurality of test conditions. One or more first thermal response parameters associated with the battery cells of the battery pack may be determined. A battery cell aging model may be generated based, at least in part, on the cell-level test data and the one or more first thermal response parameters. Second thermal response parameters associated with the battery pack may be determined, and an estimated life of the battery pack may be determined based, at least in part, on the battery cell aging model and the second thermal response parameters."

United States Patent App. Pub. No. 2021/0249702 (published 2021 Aug. 12, naming inventors Murphy et al., titled "Battery testing systems and methods") discloses, in the Abstract, "Battery testing systems and methods are disclosed. One system includes one or more test platforms and a processing system. Each test platform performs ultrasonic scans of batteries. During the scans, each test platform can place pressure upon and measure temperature and open circuit voltages of each battery, transmit ultrasound signals into each battery and generate transmitted signal data in response, detect ultrasound signals reflected by or transmitted through each battery in response to the transmitted ultrasound signals and generate received signal data in response. The processing system can quantify aspects of the signal data and present the aspects to one or more battery models, which compute and assign a state of charge (SOC) and a state of health (SOH) to each battery in response. For example, the processing system can be in a service provider network that receives and analyzes signal data sent from test platforms at different customer facilities."

None of the existing solutions provide a system with (1) inputting specifications and test conditions for an item to build and test; (2) staging the build once resources for the item are available; (3) identifying and reserving an available channel matching the test conditions from among thousands of test channels; (4) notifying a technician to build the item; and (5) tracking status, measurements, and observations of the item during the build, test, and teardown process. What is needed, therefore, is a system that overcomes the above-mentioned limitations and that includes the features enumerated above.

BRIEF SUMMARY

Detailed herein are systems and methods for large volume design, building, and testing, particularly suited for rechargeable batteries intended for long duration energy storage. A specific item, such as a battery cell, may be designed through input and selection of various components and configurations, along with desired test protocols and configurations. A build team is notified of the new item, and confirms material and resources are ready to build the item. A specific channel is reserved or committed for the test. Test data, along with specifics and any errors or conditions encountered from specification through teardown, is tracked.

BRIEF DESCRIPTION OF THE DRAWINGS

In the drawings, closely related figures and items have the same number but different alphabetic suffixes. Processes, states, statuses, and databases are named for their respective functions.

FIG. 5 illustrates an interface within the software platform displaying the testing infrastructure.

Figure 6:
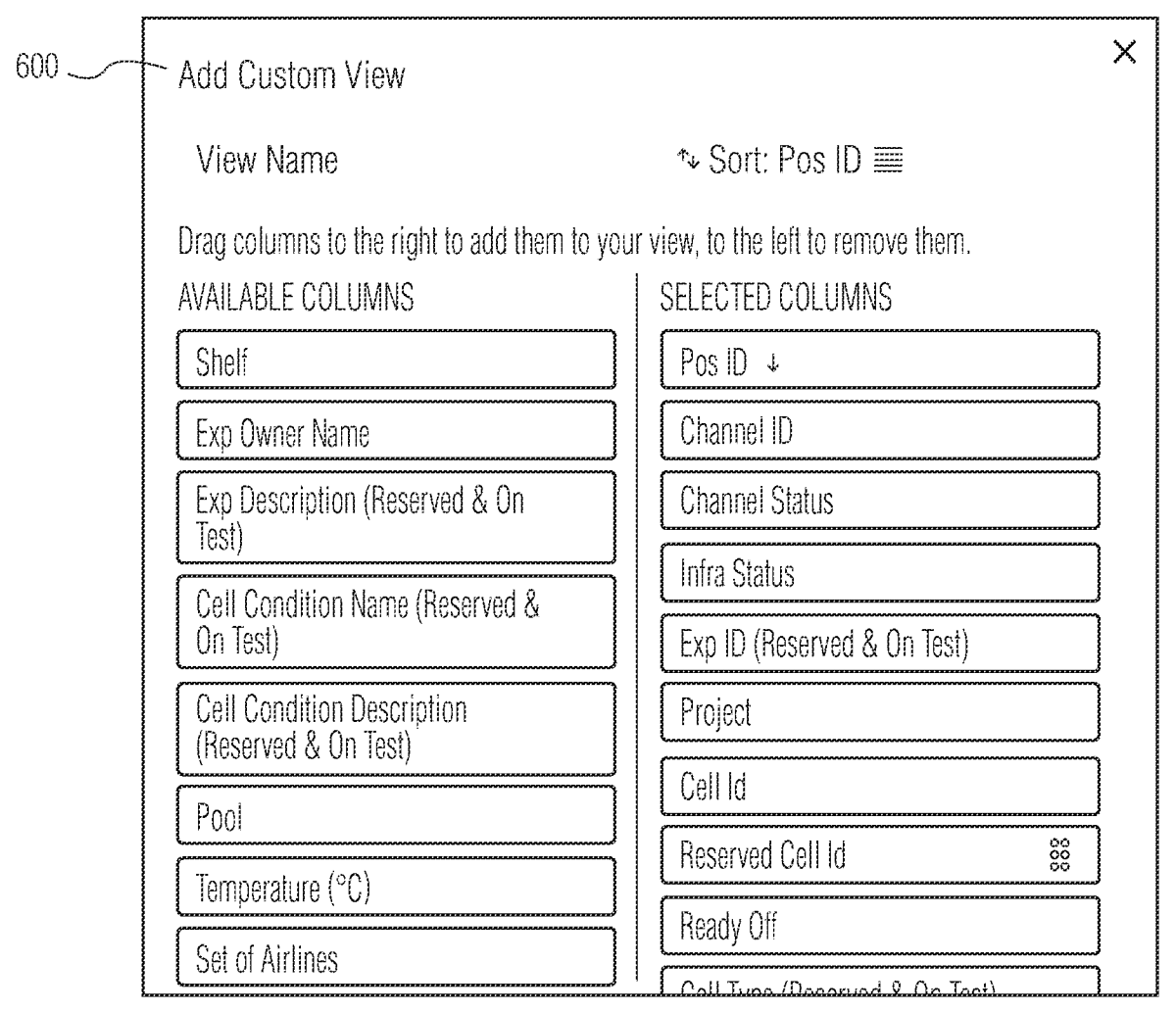

FIG. 6 illustrates an interface within the software platform for configuring a customized view.

Figure 7:
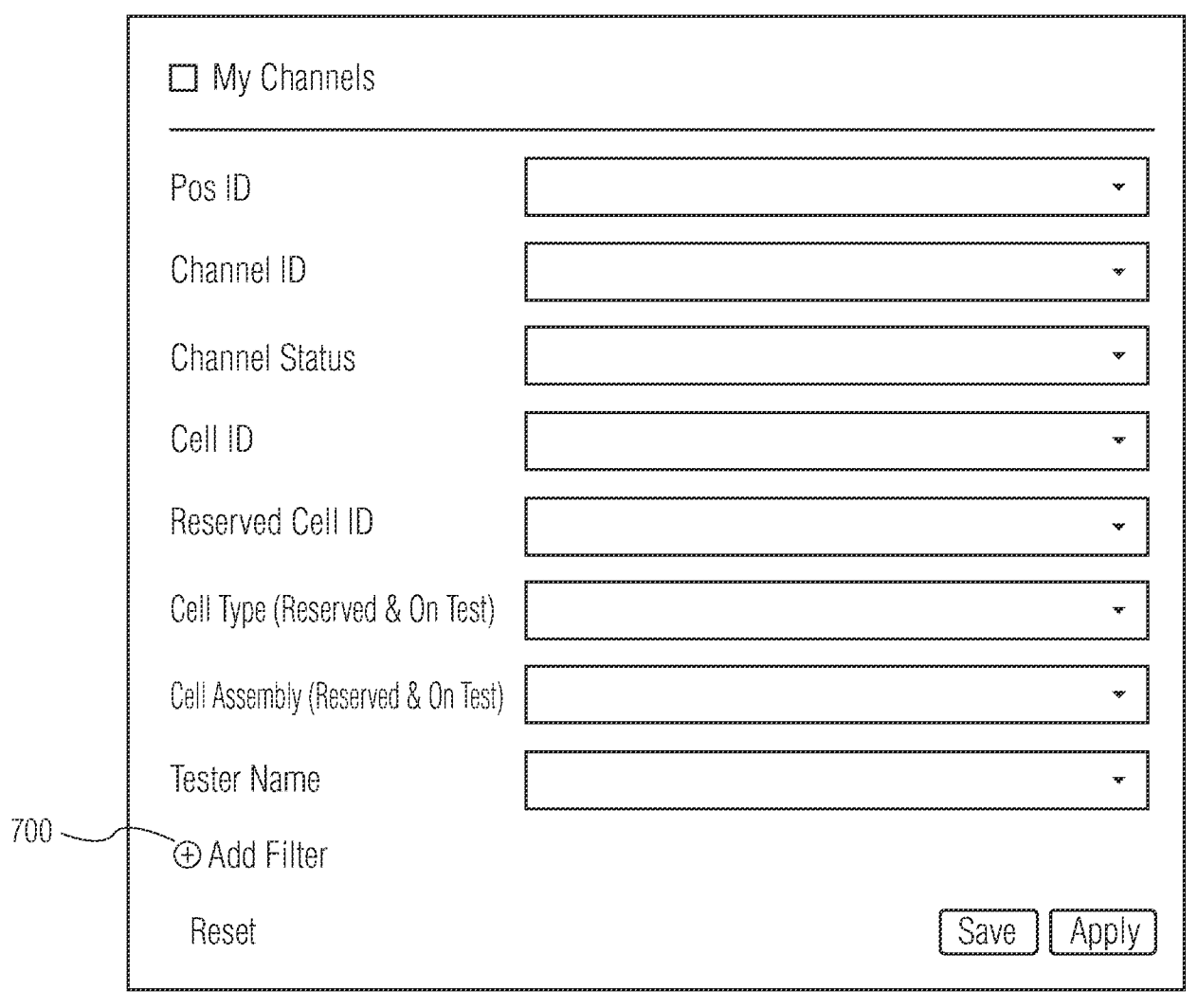

FIG. 7 illustrates an interface within the software platform for applying filters to a current view.

FIG. 8 illustrates an interface within the software platform for selecting among available data for resource when filtering.

FIG. 9 illustrates an interface within the software platform for specifying type, assembly, and number of replicates for an item to be tested.

FIG. 10 illustrates an interface within the software platform configuring build and test conditions.

FIG. 11 illustrates an interface within the software platform showing a created experiment with identifier.

FIG. 12 illustrates an interface within the software platform for configuring test conditions.

FIG. 13 illustrates a template for configuring a cell type that can be designed within the software platform.

FIG. 14 illustrates an interface for configuring a filter on a current view.

FIG. 15 illustrates the interface of FIG. 14 with further filtering selections.

FIG. 16 illustrates selection from previously saved filters.

FIG. 17 illustrates an interface for staging specified experiments.

FIG. 18 illustrates an interface for starting to reserve a test channel.

FIG. 19 illustrates an interface for reserving a specific test channel.

FIG. 20 illustrates an interface for committing staged experiments.

FIG. 21 illustrates an interface for entering data specific to the build and test of an experiment.

FIG. 23 illustrates an interface display sorted based on priority.

FIG. 24 illustrates an interface displaying test channels within the test infrastructure.

FIG. 25 illustrates an interface for sorting based on specific attributes within the test channel display of FIG. 24.

FIG. 26 illustrates an interface specifying details of a build step where a specific engineer is requested to perform the step.

FIG. 28 illustrates an interface line with a flag displayed indicating a non-standard build is required.

FIG. 29 illustrates an interface to assign a specific build task to a selected user.

FIG. 32 illustrates an interface displaying specified details of an item, and metadata of the item as measured during build.

FIG. 33 illustrates an interface for starting the testing stage.

FIG. 35 illustrates an interface for entering measurements and observations from teardown of a test.

FIG. 36 illustrates an interface to reserve specific channels for testing.

FIG. 37 illustrates an interface to specify requirements for channels.

FIG. 38 illustrates an interface to configure specific attributes to match searching channels.

FIG. 39 illustrates an interface displaying a list of channels that have been reserved.

FIG. 40 illustrates an interface for savings a customized table display within the software platform.

FIG. 41 illustrates an interface to enter metadata about multiple items.

FIG. 42 illustrates an interface to enter notes and photos of an item.

FIG. 44 illustrates an interface for a specific metadata entry during a test.

FIG. 45 illustrates an interface for marking items as ready to take off test.

FIG. 46 illustrates an interface allowing editing or undoing of off-test items.

FIG. 47 illustrates a teardown interface.

FIG. 51 illustrates an interface for a updating a selected teardown.

FIG. 52 illustrates an interface to log events.

FIG. 53 illustrates an interface to view event summaries.

FIG. 55 illustrates an interface to input data shared across multiple characterization samples.

FIG. 56 illustrates an interface to input data about characterizations for individual samples.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current invention. Where there is a conflict, the following definitions apply.

Cell: A standalone battery component that is the basis for testing and R&D. This may reference a subscale cell, which is primarily used for testing mechanical configurations and different chemical combinations, or a full scale cell, which is intended to be closer to the actual product.

Module: A collection of cells connected in series. Modules are the closest representation of product in the field and are primarily used to test battery management configurations, as well as confirming that the cell electrochemistry works as expected when connected together.

Device-under-test (DUT): Used to refer to either a cell or a module in the context of a test within the software application.

Channel: A piece of physical infrastructure that a DUT is tested on. Channels can sometimes be housed within an incubator to maintain a desired operating temperature.

Specification: this refers to data points that a cell owner specifies before the cell is built.

Metadata: this refers to the actual measurements of an item or cell's components as they are built, along with other measurements about the item tracked during test and teardown.

Subassembly: this refers to an individual subcomponent of an item or cell. Each of the subassemblies require their own development process before getting pieced together, so we refer to this category of components as subassemblies.

PLM: Acronym for "Product Lifecycle Management"

Operation

Figure 1:
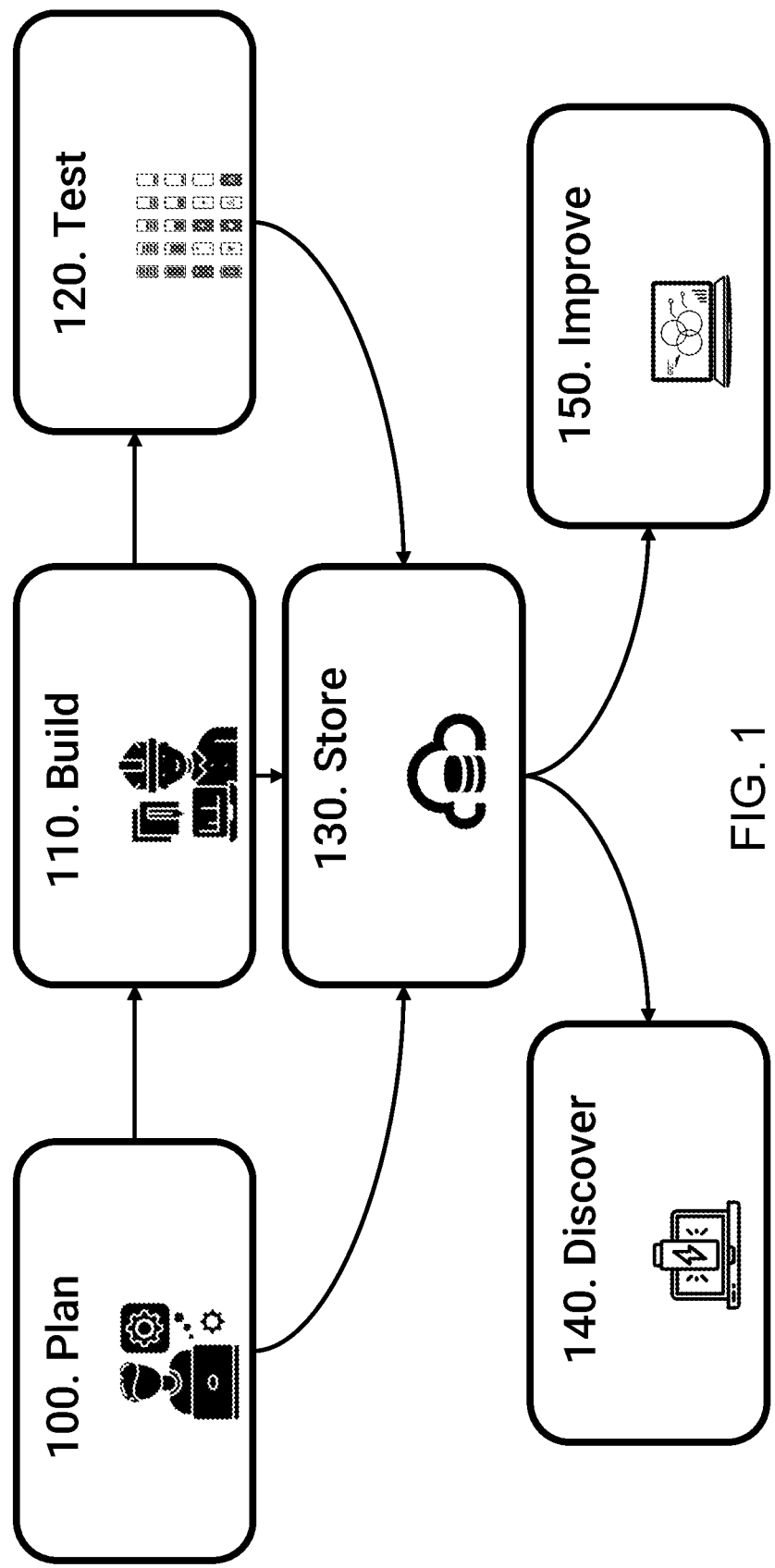
FIG. 1 is block diagram of different stages.
Figure 2:
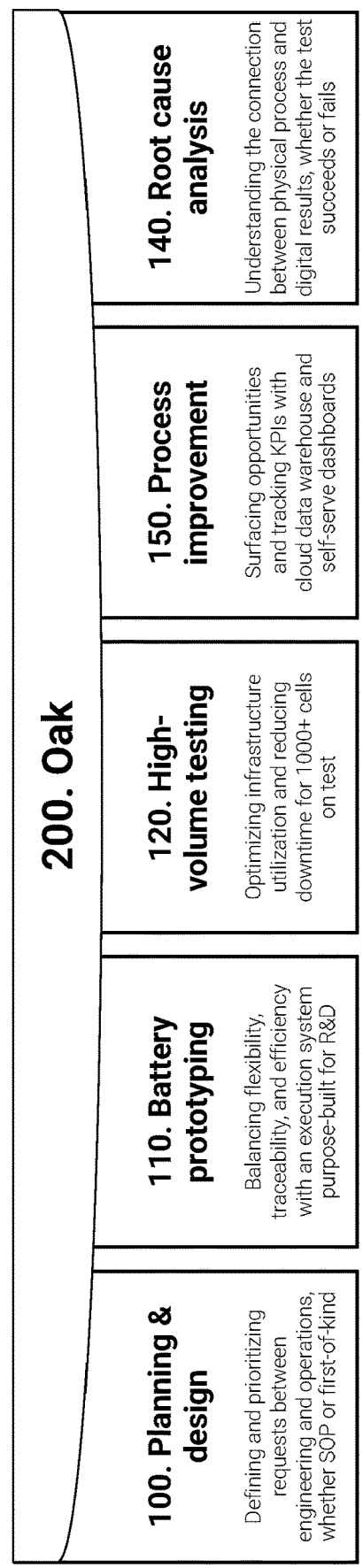
FIG. 2 is a flowchart of various stages and their benefits.

Referring to FIGS. 1 & 2, the overall system and method involve and integrate different stages. An initial plan 100, design, or prototype is submitted. The device is then built 110, and placed under test 120. Throughout all stages data is stored 130, allowing review to discover 140 test results and improve 150 designs and testing.

Figure 3:
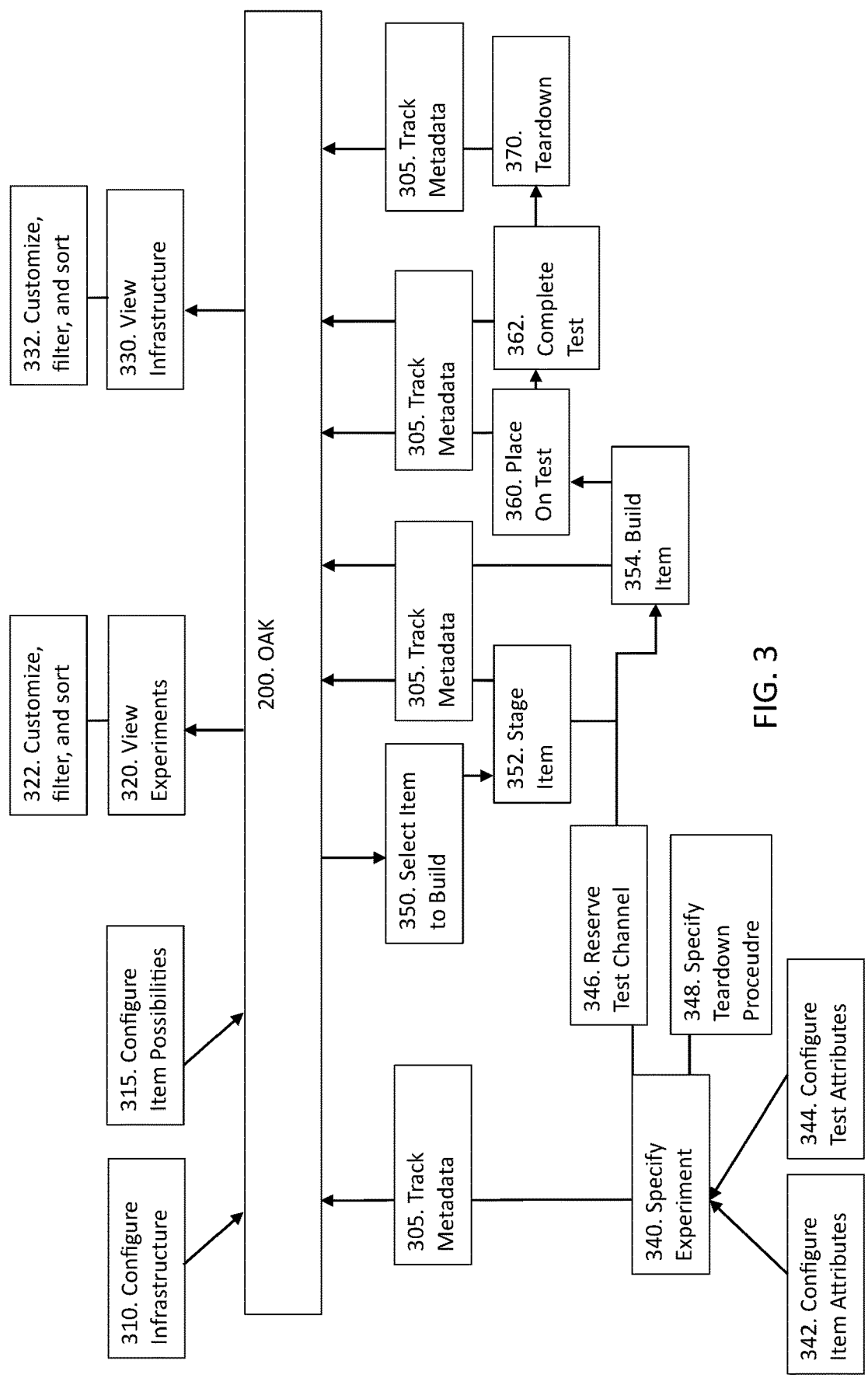
FIG. 3 is a flowchart overview of the design, build, and test system interactions.
Figure 4:
FIG. 4 illustrates an interface within the software platform displaying all experiments (tests).

Referring also to FIG. 3, a preferred implementation uses a design, build, and test management software platform 200, referred to as the Oak platform. The software platform is preferably implemented within cloud-based software with browser-based access, but may alternatively be implemented for operation on dedicated servers and accessed through dedicated applications or programs run on client devices. Utilizing a cloud implementation, or a serverless backend, maximizes scalability. This means that as the number of users or requests to the backend increases, the system can handle the increased load without any engineer intervention. This essentially guarantees uptime for users and ensures that they have access to the necessary data and systems when they need them, as well as frees the developers to focus on more customer-oriented tasks.

Actors interacting with the platform include administrators, designers or experiment owners, builders, and testers. Individuals may perform multiple of these roles, but to scale to simultaneous testing of thousands of items across many different test machines, multiple actors are needed. Administrators configure the platform, including configuring what components are available for selection when designing items, what test conditions may be configured for testing items, what test machines are available for use during test, what are the capabilities of each test machine, and what procedures are selectable for performing during post-test teardown of items. In the illustrations, administrators have configured the software platform for long duration energy storage (battery) cell design and testing, but the platform could alternatively be configured for large volume item design and testing. Designers interact with the platform to specify details of one or more items to build, and conditions to apply to each item during test. Builders are notified when items are designed and ready to build, and build the items as specified by the designers. Testers connect the items to test machines, operate the test machines, and monitor the items during test. Builders may also tear apart items after test. Throughout each stage, observable data about the item may be input through the software platform and tracked 305 as metadata.

The software platform utilizes different functionalities, which may be implemented directly within the platform, or by integration of third party software. These functionalities include notification/communication, such as Slack, product lifecycle management (PLM), such as Arena and Inmass, project management, such as Asana, data warehousing, such as Snowflake, business intelligence (BI), such as Sigma, word processing, such as Google Docs, spreadsheets, such as Google Sheets, and presentation, such as Google Slides. Each stage may also involve different software functionalities specific to that stage, which may be modules or separate interface screens within a larger application, or separate applications. The preferred implementation utilizes cloud-based software allowing browser-based access from any network connected computing device, with user authentication and authorization through standard authentication methods, such as Google OAuth.

Administrators may assign default or Manager roles. A standard role may be assigned by default to provide access to the software platform but no special privileges. A Manager role within a build team can be assigned to a user managing the build operation. The Manager role may have special privileges such as allowing final say in a process, or to expedite a normal development process. For instance, when the software platform is used for managing development of testing of battery cells, a cell may reach a certain point in the build process where any changes to the build specification would disrupt the normal build process. A user with a Manager role on the build team will be alerted, and the change will not be allowed to go through until the manager approves the change.

Administrators need to configure 310 the platform to be aware of the testing infrastructure, and types of possible items and components that can be used in design. As directly coding this within the software platform would require updating the platform any time testing infrastructure changes or new item building possibilities are added, a preferred solution uses spreadsheet templates which are then loaded by the software platform. An infrastructure template may define a test machine, number of channels for testing within that machine, and test conditions possible to control on each channel. Test machines may be named and grouped for logical layout within a testing facility. After an infrastructure template is loaded into the software platform, test machines defined in the template become available to match and reserve for tests within the platform. Item templates similarly define 315 types of items that can be designed within the platform, including optional and required fields, and data types for those fields, allowing alterable configuration of aspects of the item being designed, including any components or sub-assemblies which may be part of the item. In addition to configurable aspects for item design, the item templates may define observable data fields which the software platform tracks as metadata enterable during build, test, and teardown of items. Alternative to templates, user interface screens within the software platform may allow administrator input of the same information.

The software platform may integrate with an external PLM. The PLM integration enables users to specify and input material/part number IDs, with the benefits of searching by name, autocomplete, and material/part number ID validation, for any materials and parts tracked within the PLM, and usable in building items and running tests.

Referring also to FIGS. 4, 5, 6, 7, & 8, with the platform testing infrastructure configured, experiments or tests 400 and testing infrastructure 500 may be viewed 320, 330 within the software platform in a list format for overview.

There may be preset columns of information for each view, but views may also be customized 322, 332 and saved to display different pieces of information through a drag-and-drop interface 600. In addition, views may be sorted and filtered 700 on all available data 800 for a given resource. Custom filter views may also be saved for future use.

With possible item designs configured within the platform, the software platform may provide designers selection of item types to design and test. Specific to battery design and testing, users may be provided with a list of cell types to test, which refers to the most basic makeup of the cell, such as what battery components the cell is meant to have. Users may also choose a cell assembly type, which is a more granular categorization within the larger cell type. Each of these cell type-assembly combinations has a number of specification fields, some of which are required for a user to complete the specification process and others that are optional. In addition to specifying the physical characteristics of the intended cell(s) to be built, users may also specify the conditions under which to test the cell(s).

Similarly, each item may have a number of data points to capture as metadata. Specification of an item is selection of a category or type of item, component, or subassembly, while metadata entry is of observable data about the item. Specific to batteries, specification data refers to a certain category of cell to be built, and metadata refers to individual cell measurements. Items may also be replicated, allowing creation of multiple items for test at the same time. Referring also to FIG. 9, a battery cell may be specified with a cell type 900 and assembly 910, and may have multiple replicates 920. Each replicate results in its own individual cell with matching specification, but its own metadata tracked for each individual cell.

Administrators can easily add new items, components, and metadata fields through templates imported into the software platform. Specific to batteries, these may be new cell types, assemblies, and data fields as required by battery engineers. Additionally, the requirement status of each field can be adjusted within the software platform without requiring a deployment of a new version of the site, which expedites the cell development process. The specification and metadata interact such that certain specification values are shown if the system is configured to require the same value during the metadata collection phase. However there are also some metadata fields that are specific to individual phases, such as of cell development, and don't have a specification counterpart.

Metadata fields may also be configured that need coordination across different categories of defaults. This reduces the chance for human error and expedites the data entry process for users. The software platform recognizes when metadata is hierarchical and leads up to a top-level data point. Once recognized, if any of the lower level data points are changed, the platform also wipes out the top level data point that it ladders into.

The software application during the design stage enables engineers to define experiments 340 and request resources. Authorized users may create an experiment which defines test conditions for one or more specified items. Referring also to FIGS. 10 & 11, for long duration energy storage testing these conditions may include, but are not limited to, cell type 900 and cell assembly 910 for cell(s) to be built and tested, part identifiers for cell subassemblies, physical specifications, and test protocol versions. An experiment identifier 1000 may be assigned to track data associated with the specific experiment. Once the experiment design is created, specification details are available to build the experiment.

During experiment creation, customized documentation 1100 is generated based on the purpose of the experiment, and stored in an external file storage service.

The software platform may integrate with external word processing, and presentation programs, as well as external file storage and synchronization system. This integration enables the software platform to automatically generate customized experiment documentation, and store it in an external file storage system. These documents may then be accessible via hyperlink from the experiment page.

In addition to specifying attributes 342 of an item to put on test, experiment owners may specify the conditions 344 of the test itself. Referring also to FIG. 12, attributes such as an ID 1200 of a test protocol to be used during test, as well as how many cycles to apply during the test can be defined during specification. These attributes may be matched to configured infrastructure capabilities to identify available testing channels capable of performing the test, and inform test engineers of any configuration requirements needing to be made to the testing machine when putting the item on test. Experiment owners may choose to duplicate or replicate existing items and/or test conditions, or create new ones from scratch.

Figure 13:
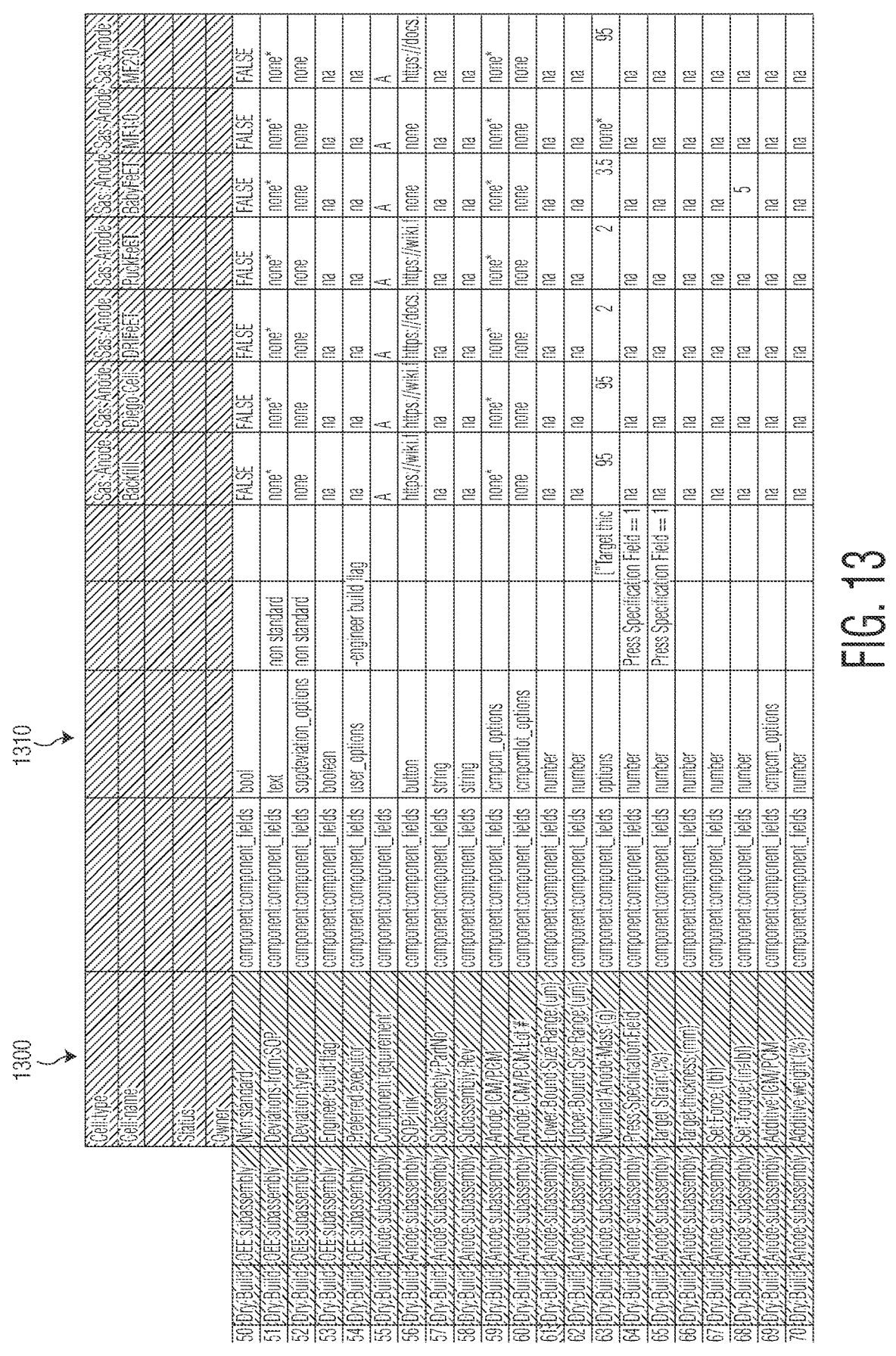

The information needed to specify and build different types of items can vary greatly. With respect to batteries, a very different user interface (UI) form is displayed for specifying each type of cell. The specific UI form is generated based on data from the template used to configure the possible cell type. Referring also to FIG. 13, the templates determine the fields 1300, data types 1310, requirements, field interactions, and default values. New templates can be created and existing templates can be edited through a spreadsheet that is accessible to administrators. This allows needed changes to be applied quickly within the platform without requiring updates to the underlying platform software.

Figure 14:
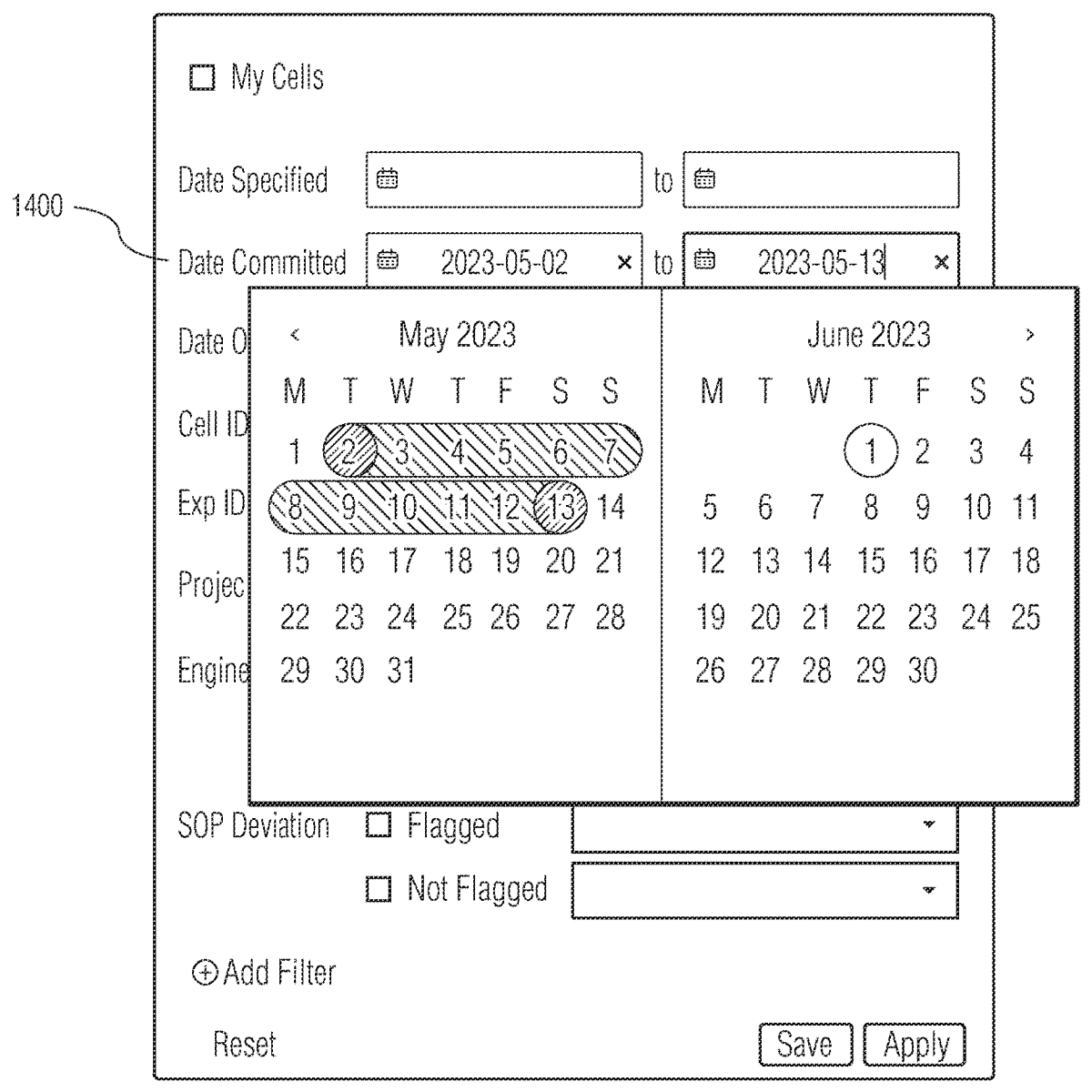
Figure 16:
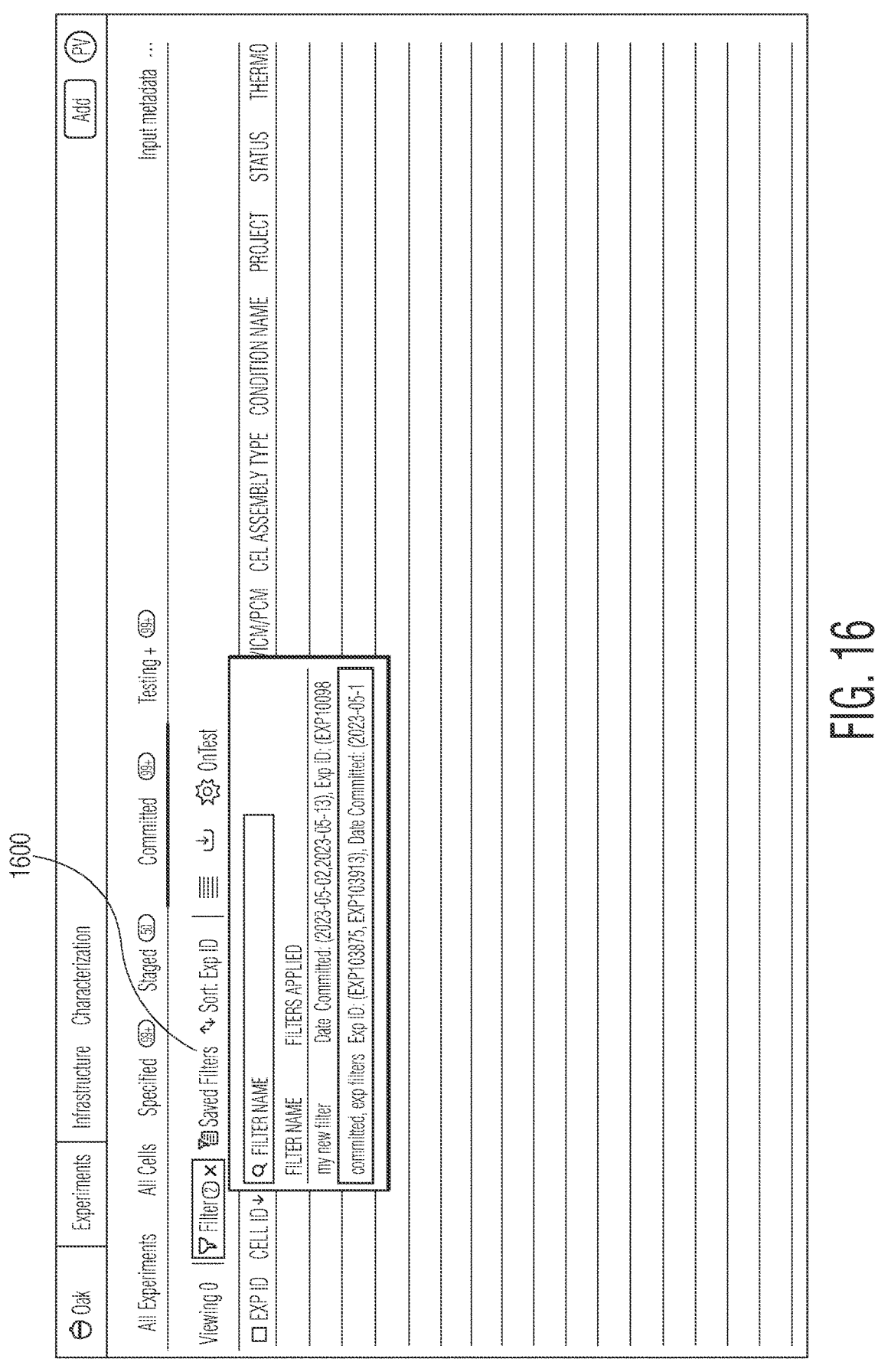

With large volume design and testing, there are thousands of item and test records tracked simultaneously within the software platform, along with historical data from all prior items and tests. Viewing all of these records simultaneously is not reasonable for an individual display, so the software platform includes a filtering mechanism to narrow the number of rows displayed to only those the user is interested in. The software platform may filter any view on any available data field. Specific to battery design and testing, there are more than forty different fields to filter on for both channel and cell list views. Referring also to FIG. 14, the filters are relevant to the data type they are searching, for example a timestamp filter such as 'Date Committed' 1400 (date a cell was put into a 'committed' state) has two fields to set a range of times within which cells were committed. Referring also to FIG. 15, the software platform may pre-fill possible values to filter on, for example the 'Experiment ID' 1500 filter displays a dropdown of IDs for all experiment records. Referring also to FIG. 16, sets of filters may be named and saved 1600 for subsequent re-use.

The software platform during the build stage aids technicians (build engineers) in building the item to test, such as producing batteries to a flexible specification. The build process moves from being specified through the experiment creation, staged when resources and materials are ready to begin the build, and committed when specific testing channels are reserved for the experiment. For long duration energy storage testing, once committed tasks are created for technicians to build the cell to the configured specifications.

Figure 21:
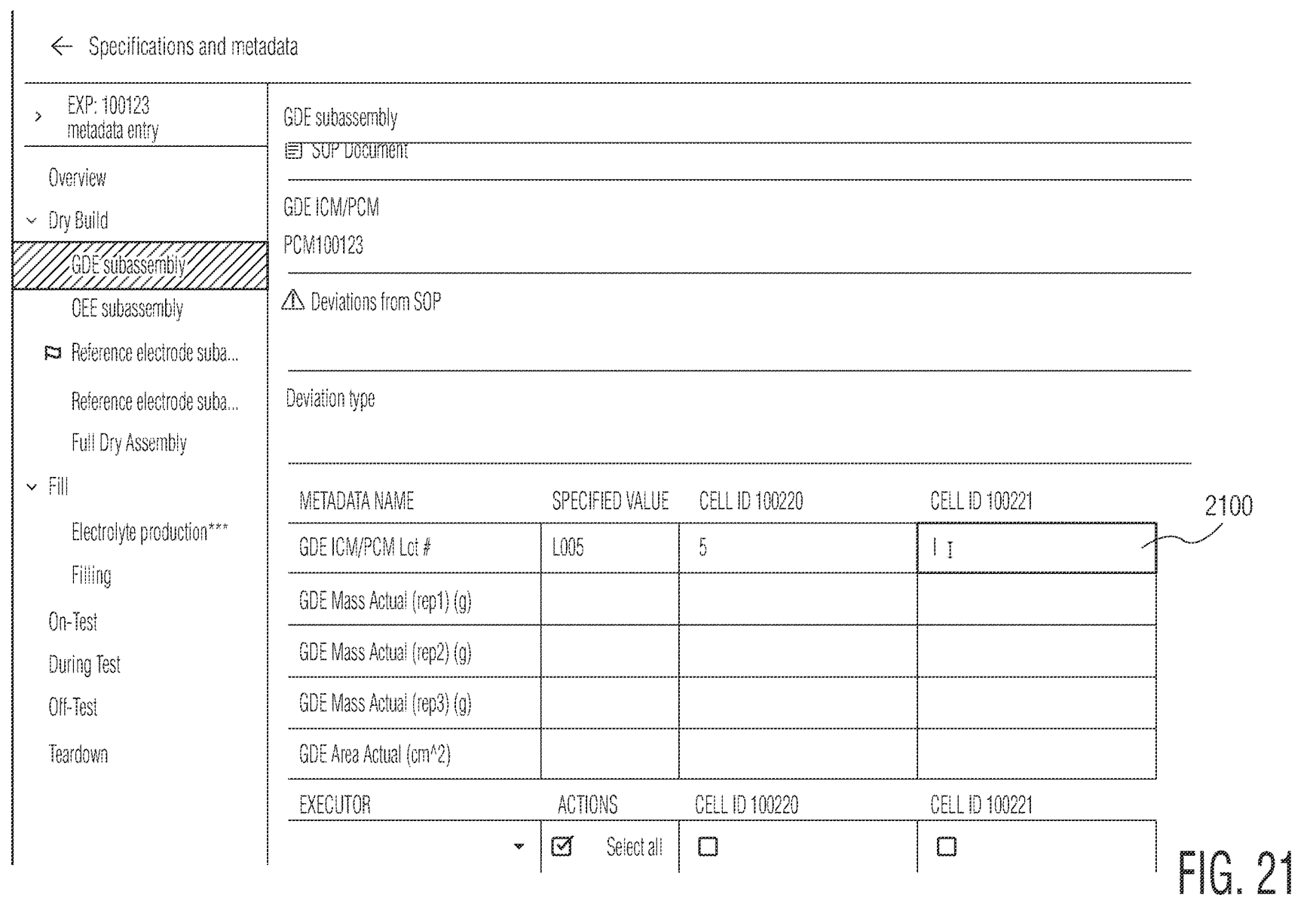

Referring also to FIG. 17, a technician or build engineer may view specified 1700 experiments, and select 350 individual or multiple experiments to stage 352. Referring also to FIG. 18, specific channels 1800 may be reserved for testing. Referring also to FIG. 19, specific channels may be selected from available channels 1900, and may be restricted to channels matching 1910 specified conditions. Referring also to FIG. 20, staged experiments with reserved channels may be committed 2000. Once committed, the device may be built 354 by the technician. Referring also to FIG. 21, data specific to the build may be entered 2100 tracking the actual build. When the build is complete, an indicator such as a filled flag may be set, and the device moved into testing.

Figure 22:
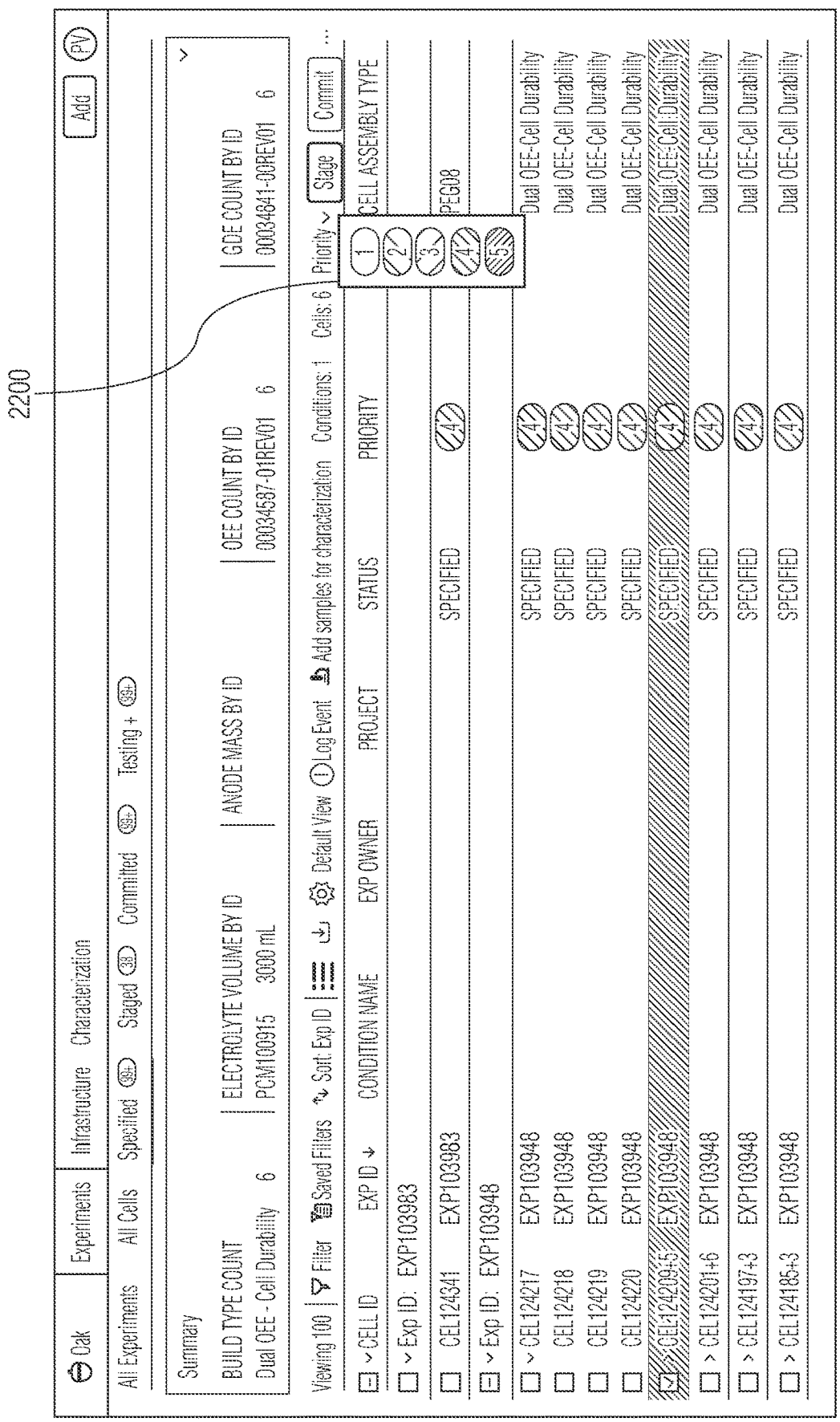
FIG. 22 illustrates setting a priority value for one or more specified items.
Figure 23:
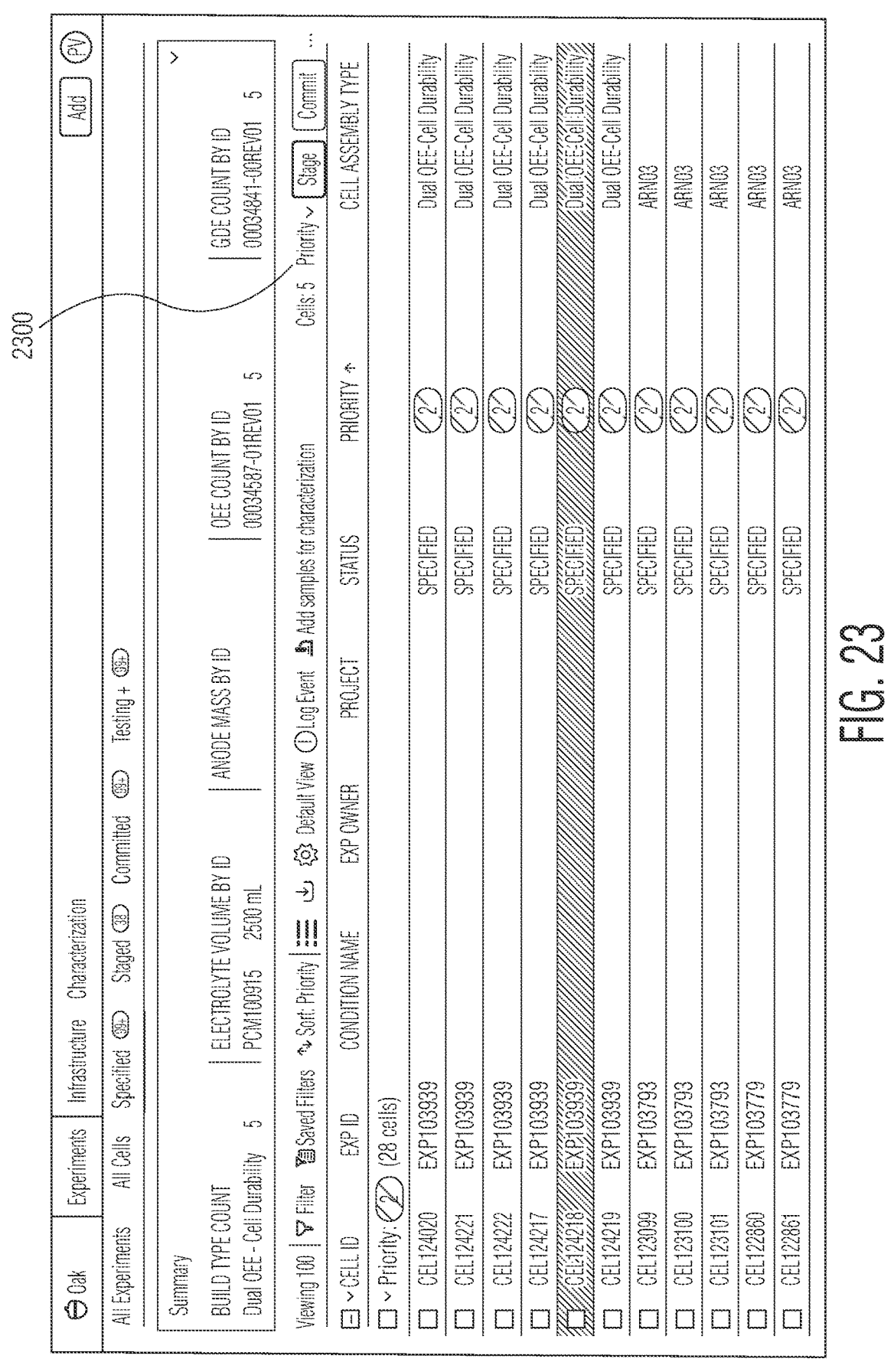

Experiment owners can communicate the priority of the items they are requesting to the build team in order to ensure that the highest-priority items are built and put on test on a faster time. Any priority numbering may be used. For example, each cell record in Oak may have a 'priority' value from 1 to 5, with 1 indicating the highest priority. Referring also to FIG. 22, to modify the priority for an individual item or selection of multiple items, experiment owners can select items within a list view one of the priority options within a dropdown 2200. Referring also to FIG. 23, the priority 2300 can be used by build teams to filter, sort, and plan what to build next.

Once items are built, they need to be placed on test within test machines able to perform the test conditions specified in the experiment. Specific channels may be reserved 346 for test at any point from designing the experiment until the item is connected for testing. Referring also to FIG. 24, engineers can view testing channels 2400 tracked within the software platform and displayed in a table format. Referring also to FIG. 25, to narrow the channels listed, users can search and filter using specific attributes 2500 of the testing channels, as well as customizing which data fields to display in the table. If there is a specific channel already reserved for a specific experiment, or if there is a item on test on a channel, the software platform associates data about the item and experiment with the channel, making it available for filtering and for display in a column on the table. This allows engineers to be better informed as they plan for upcoming testing, as well as gives them an overview of the current state of the testing infrastructure.

Some specified experiments may require special attention, and may have one or more special flags set within the user interface. One type of flag may indicate that a specific engineer is requested to complete a specific step, such as within an anode subassembly step of building a cell. Referring also to FIG. 26, the preferred engineer 2600 is then listed in various places within the interface to notify other users.

Figure 27:
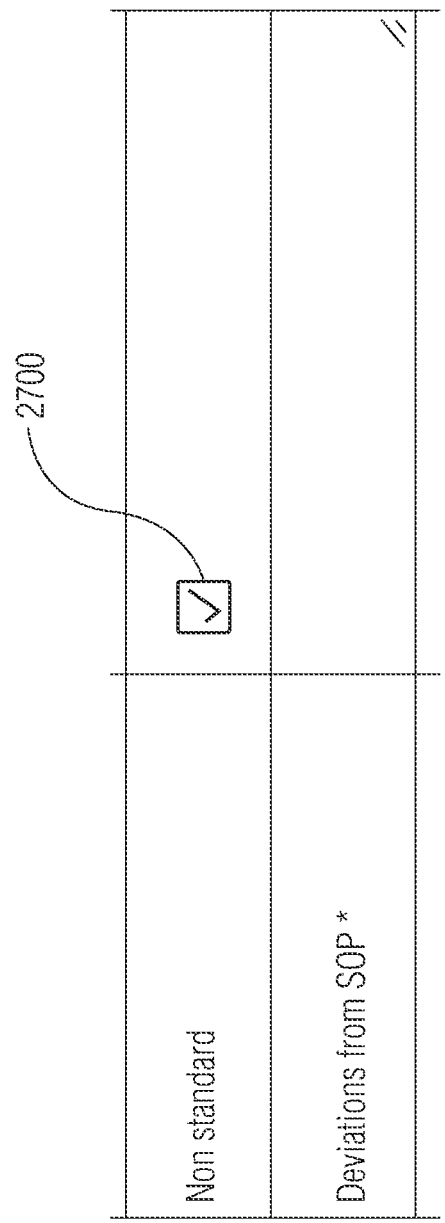
FIG. 27 illustrates an interface to indicate a non-standard build request and provide details about any deviations.

Another type of flag indicates that there is a deviation from a normal item build. For example, deviations from typical cell builds can be specified during certain subassembly steps to indicate the deviation across teams. Referring also to FIG. 27, such deviations may be indicated using a non-standard checkbox 2700, and more information can be added about the deviation via a text box. If a part is marked as non-standard, the deviations information may be required to be filled in before a cell's specification can be completed.

Referring also to FIG. 28, once a part has been marked as non-standard, the deviation is marked via a warning icon 2800 or by listing the deviation depending on the specific user interface screen.

There are many tasks within building, testing, and tearing down a cell. Referring also to FIG. 29, tasks may be assigned to different users 2900. A timestamp may be tracked when the task is marked as completed by the user. Task assignment and completion may handled entirely within the software platform, or through integration with project management software such as Asana. In such case, assigning a task within the software platform may automatically generate tasks to complete within the project management software, and the status within the project management software is tracked and synched with the software platform.

Throughout the initial phases of the item and experiment specification process, designers can freely make changes to the original specifications. After the build process begins, certain changes may require approval in order to make sure the requested change is possible and gets propagated to the in-progress build. In these cases, users can use a change request process. If a user makes a crucial change to the item specification, a designated build team user receives a change request notification, such as through email or other notification or communication software.

The software platform may include built-in notification as well as integration with third-party software notification options in order to alert users to any tasks to complete, events that occurred, or updates that require their attention. These options include, but are not limited to, email, slack notifications via a dedicated channel, Asana tasks, or any combination of the prior options.

Figure 30:
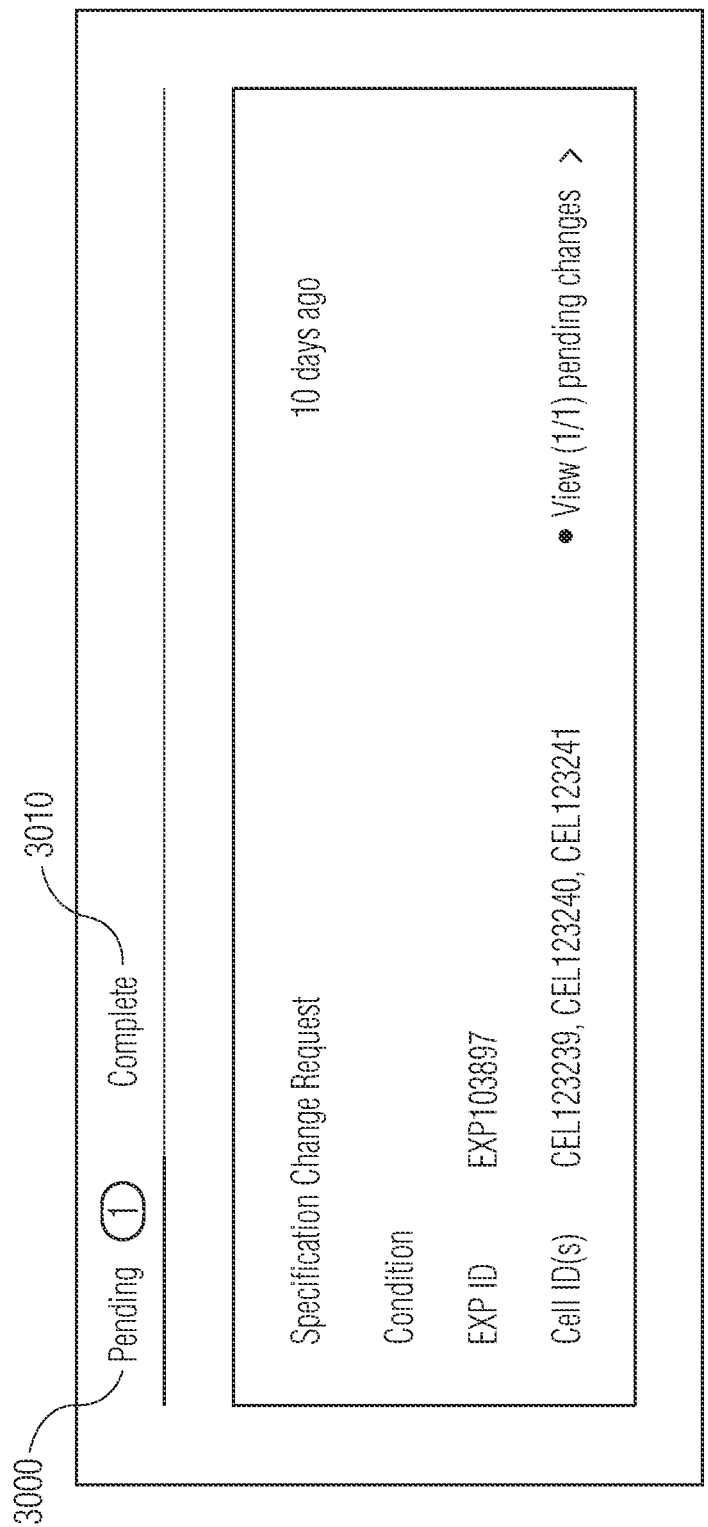
FIG. 30 illustrates an interface displaying pending change requests.

Referring also to FIG. 30, the designated user can view all the change requests assigned to them within a user interface screen of the software platform displaying an overview of the pending 3000 and completed 3010 changes. Additionally, all users who access the specification details for an item with a requested change may see a displayed message that there is a pending change request.

Figure 31:
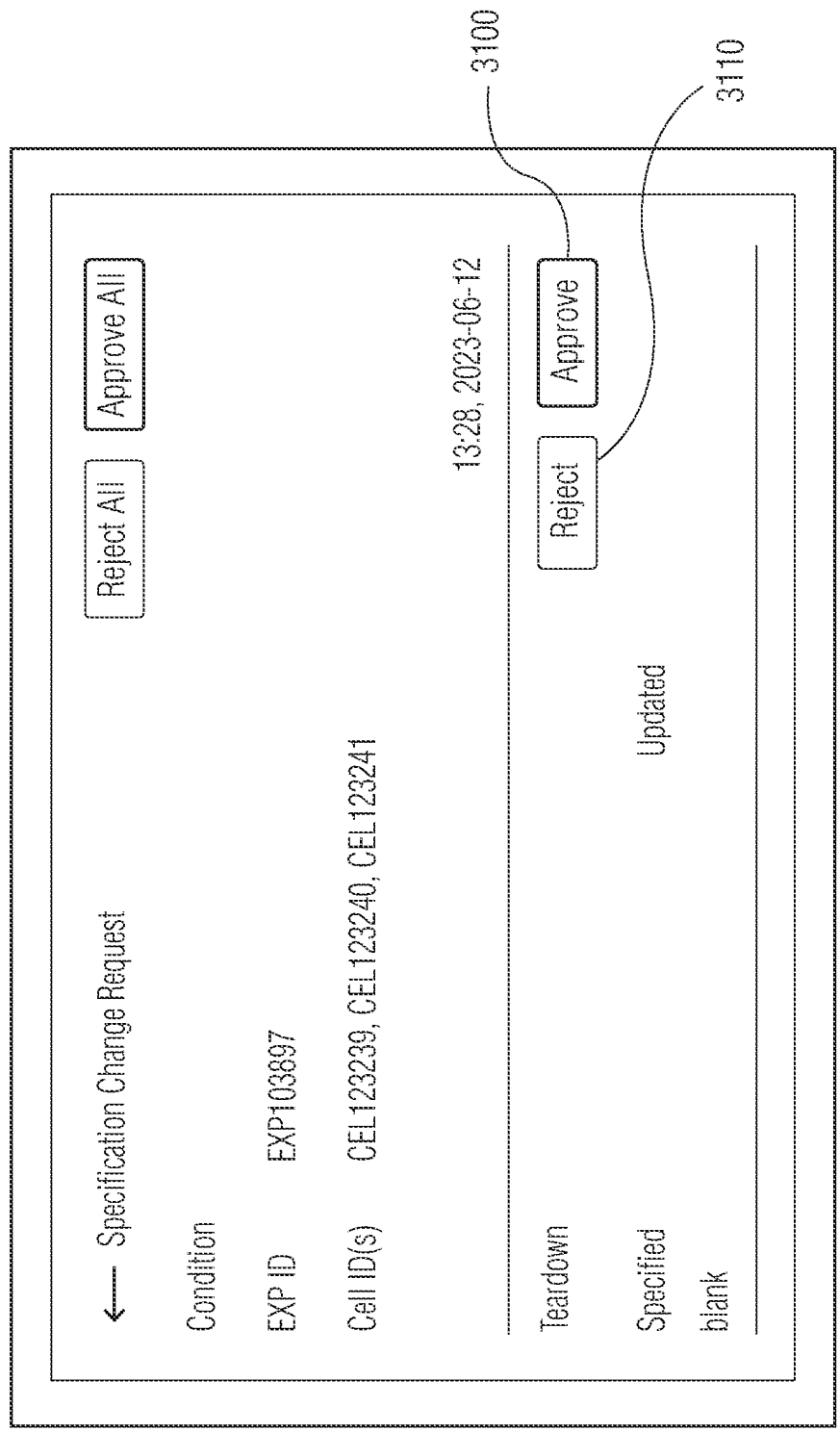
FIG. 31 illustrates an interface displaying change request details, with options to approve or reject the change request.

Referring also to FIG. 31, the designated user may view more details about the nature of the requested change, and choose to either approve 3100 or reject 3110 an individual request, or all of the requests assigned to them.

Once the request is approved, the requester is notified and the change is pushed through for processing during the ongoing build. The change request now moves into a "Completed" category, where users can view all historical change request data.

Build technicians build items based on specifications from the experiment owners. During the build phase, they enter measurable observations as metadata about the build during build/assembly. Referring also to FIG. 32, tracked metadata 3200 can be compared with specification 3210 during analysis, such as to identify true electrochemistry performance of cells.

The software platform during the test phase enables a testing team to simultaneously manage high volume testing, such as simultaneous testing of thousands of battery cells.

Figure 33:
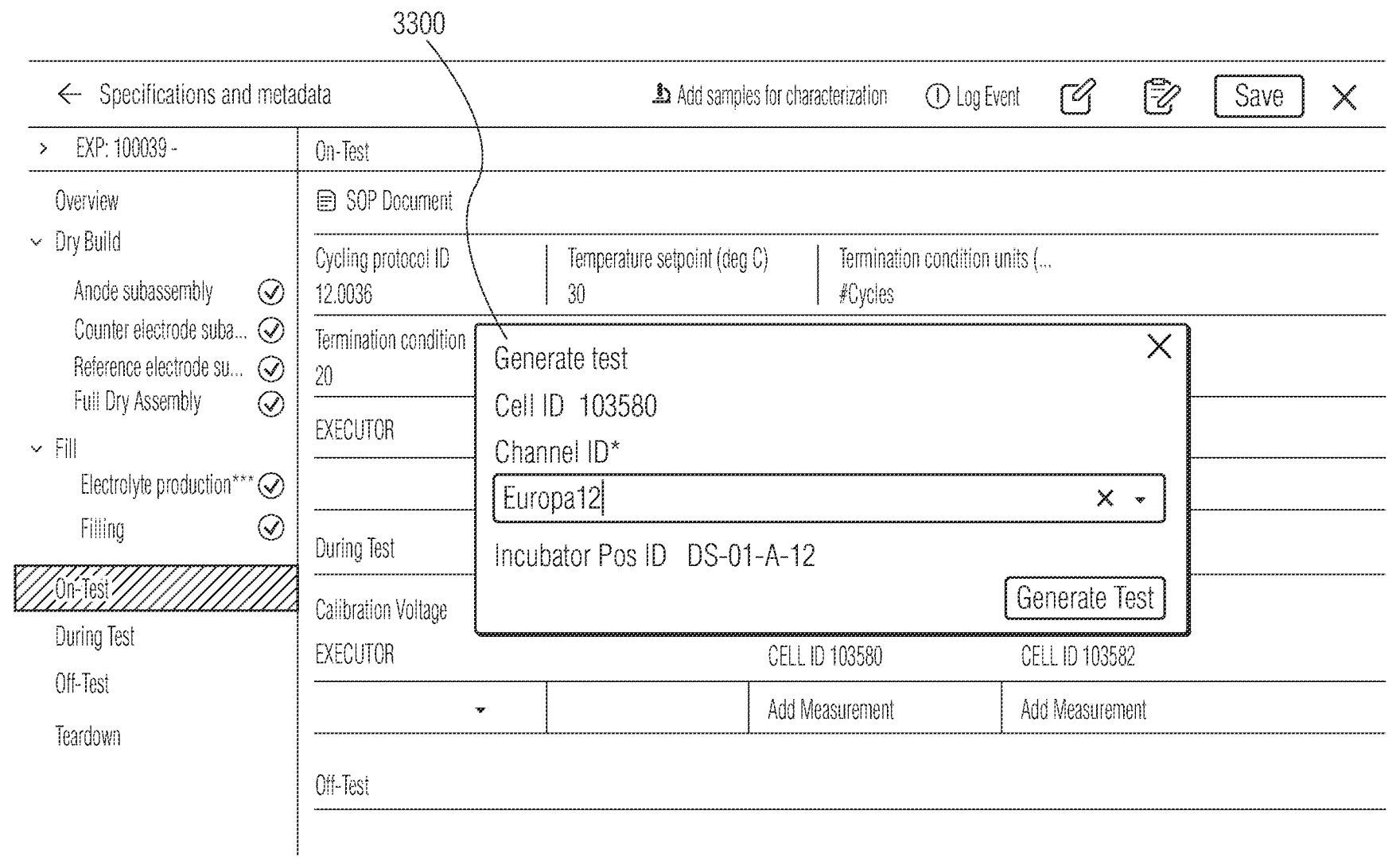
Figure 34:
FIG. 34 illustrates an interface for entering measurements and observations during test.

Referring also to FIG. 33, for some test machines, the software platform may connect with or generate script or code 3300 to control a specific test machines, such as a battery cycler, and test items based on specified test conditions. Other test machines may require manual configuration or operation by test engineers to configure the specified test conditions. During the test, sensors may monitor device and channel characteristics, which may be automatically recorded and viewable, such as metadata about the experiment or error conditions encountered. Additionally or alternatively, referring also to FIG. 34, measurements 3400 and observations during test may be input and retained in the experiment metadata. When a test is complete, referring also to FIG. 35, the tested device may go through teardown 3500 and any measurements or observations 3510 may be recorded.

The software platform keeps track of the testing infrastructure, including physical channels within test machines, such as within incubators and battery cyclers for testing battery cells, as well as the capabilities and characteristics of each channel. These pieces of infrastructure may be tracked in data storage accessible to the software platform, and may be viewed and edited by administrators. Administrators can change characteristics of existing channels, add characteristic categories to each of the channels, or add new channels altogether, to seamless update the testing infrastructure available within the software platform.

Figure 36:
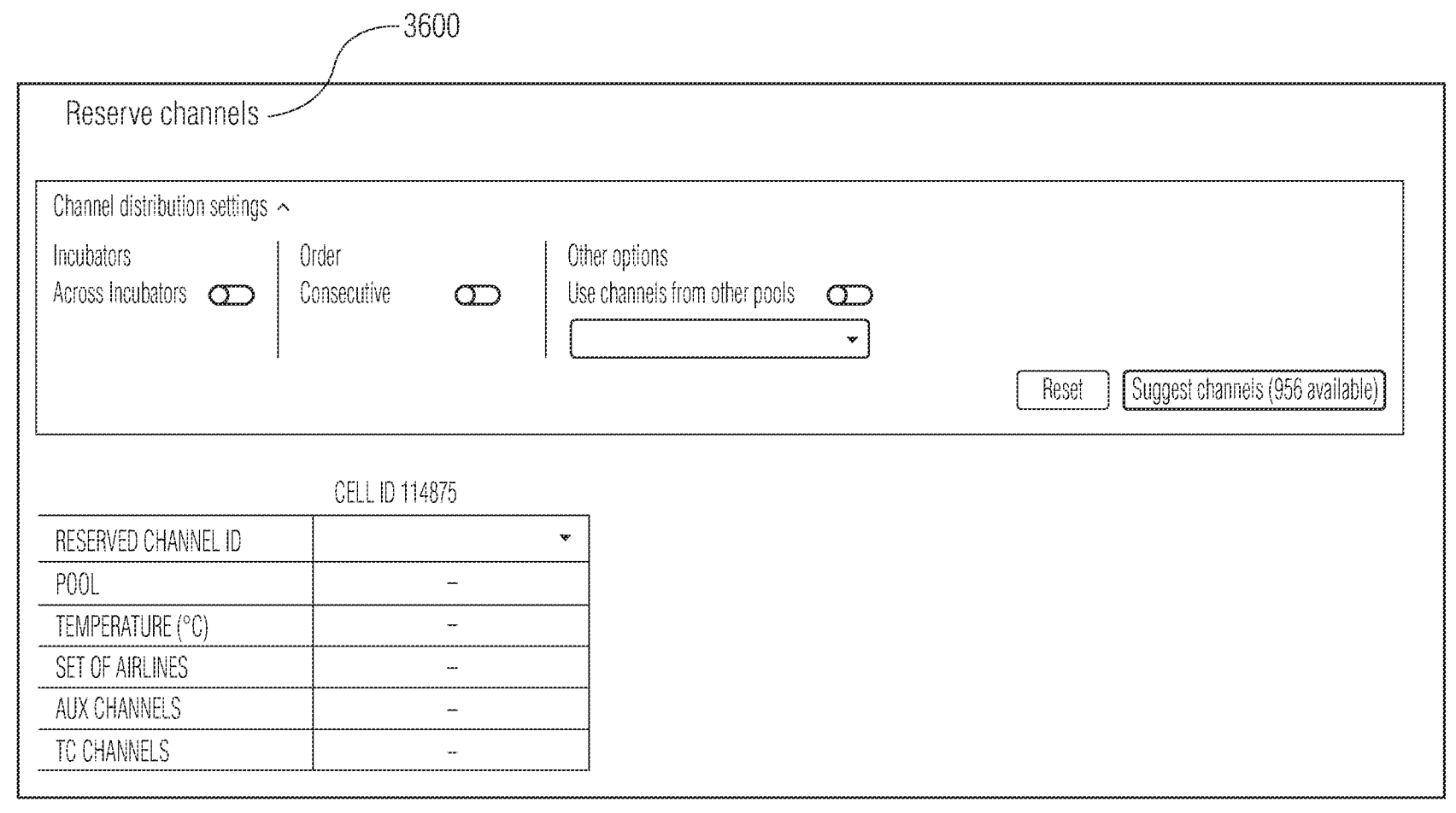

Referring also to FIG. 36, this dynamic tracking system allows users to search from and reserve channels 3600 that fit their testing needs. Some experiments may required specific tests or monitoring, in which case channels can be filtered to display only matching channels. For example, and referring also to FIG. 37, some battery cells may require hydrogen monitoring 3700 during a test, and only a certain subset of channels fit that requirement for the given cell type. Certain physical configuration of channels may be desired, such as arranging items in consecutive channels, or alternatively spreading items across different test machines. Referring also to FIG. 38, attributes may be applied to search channels by specifying each field 3800 that the channels have that a user might want.

Referring also to FIG. 39, once the user is satisfied with the channel choice and has reserved a channel for test, the software platform indicates that channel as "Reserved" 3900 any time the reserved channel is viewed.

Figure 40:
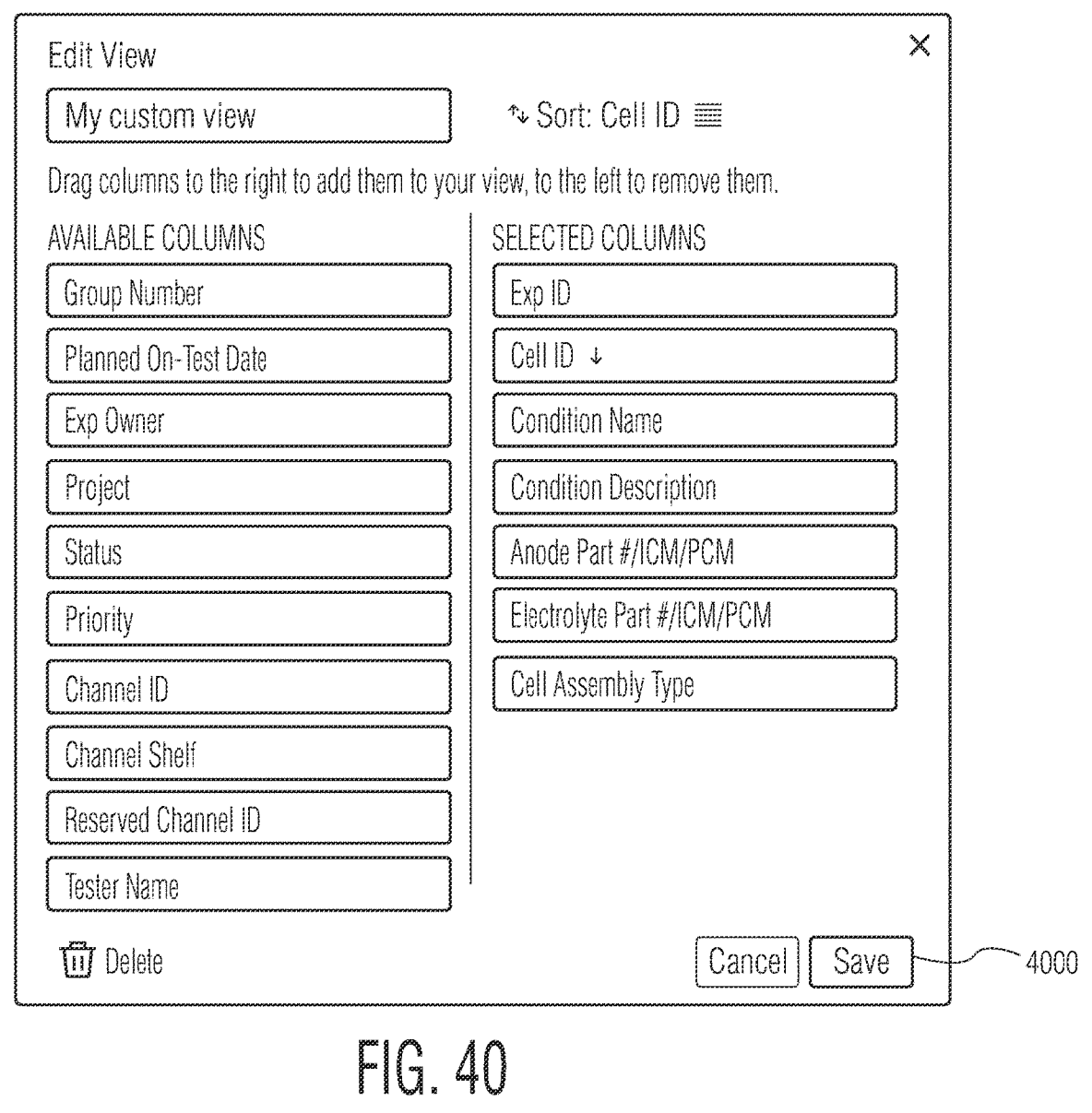

With test channels reserved for staged experiments, specified items are built to place on test. Data about the experiments and channels may continue to be viewed within filterable, sortable tables within the software platform. Referring also to FIG. 40, the columns displayed on channels and items list views may be customized by any user, and then saved 4000 so they or other users can use those customized sets of columns upon subsequent visits to the software application.

Multiple items may be grouped, such as by a grouping if created as replications or by selection of multiple displayed items if an engineering is building or observing multiple items at once. In such cases, metadata entry may be possible for multiple items at the same time. Build data may be broken into component or subassembly section, allowing different engineers to work on different aspects of an item at the same time. For example, referring also to FIG. 41, there may be multiple battery cells within a specified cell condition, in which case the inputs on a displayed screen for all the cells in that condition may be in a tabular format, allowing engineers to enter metadata for multiple cells within a single page. The fields for metadata entry about battery builds may be grouped by cell subassemblies, allowing teams of engineers working on different subassemblies to easily navigate to the subassembly section that is relevant to them, and for the subassembly sections to be marked as "Completed" at their own pace. Technicians may also add "Notes" for any of the item displayed on the metadata entry page in order to communicate any other data about the item(s) that are not captured by the fields in the metadata entry form. A specific illustrated example is an OEE subassembly of multiple cells, including specification data 4100 at the top of the section. Referring also to FIG. 42, notes 4200 may be entered for any item, including the ability to attach a photo 4210 with the notes.

Figure 43:
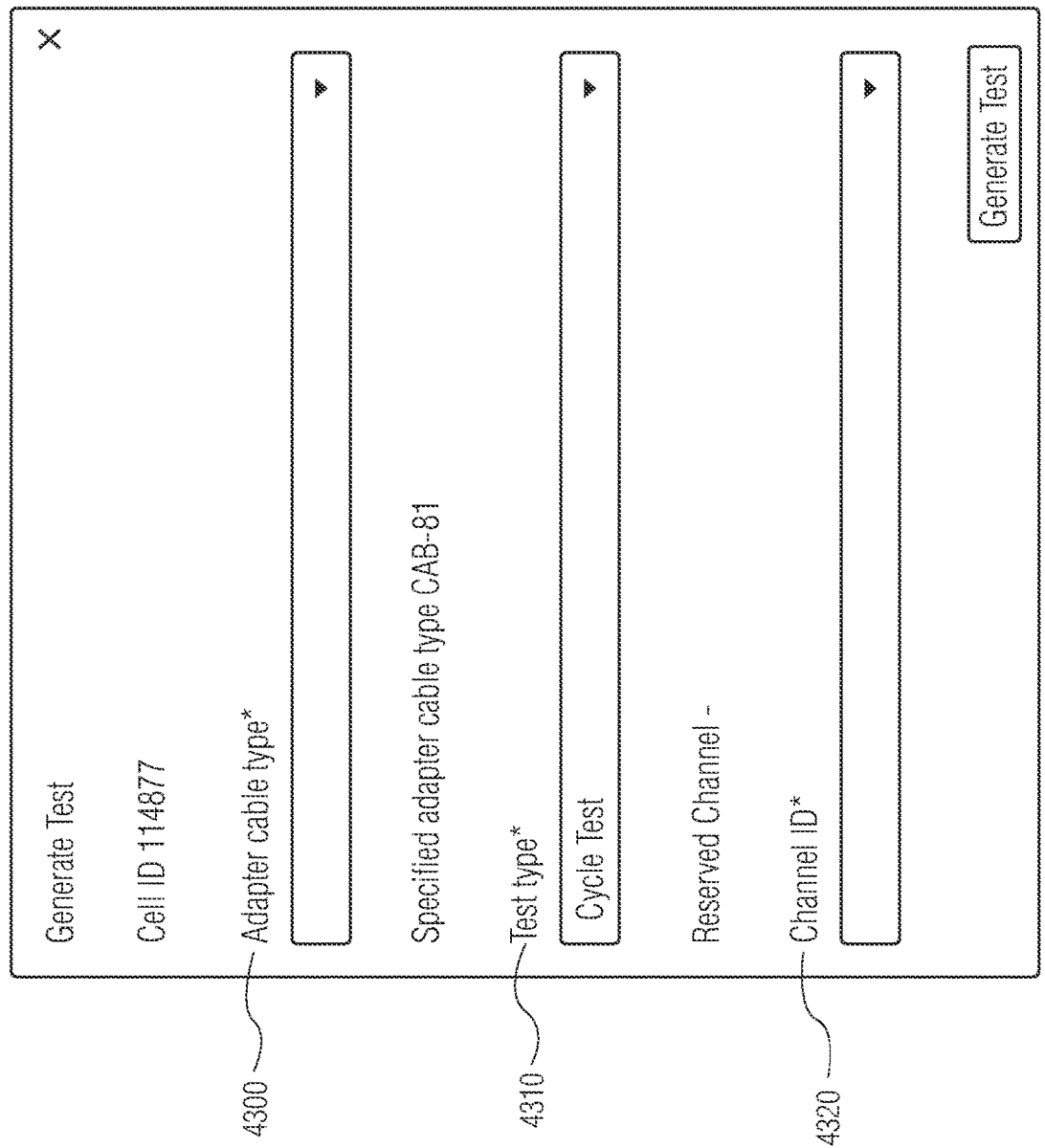
FIG. 43 illustrates an interface for placing an item on test.

Once an item has been built and a channel reserved, the test can be generated within the software platform and the item connected to the channel for testing. Referring also to FIG. 43, in order to put 360 an item on test, specific information may be required, such as specifying the adapter cable 4300 type, the test type 4310, and the channel 4320 the cell is being tested on for battery cell testing.

If a channel has not been previously reserved for the experiment, a test engineer may use the previously discussed channel selection and reservation system in order to find an available channel that matches the experiment requirements. The software platform may connect directly to test machines to control the test, or generate a machine-specific file with test script or code to operate the test machine. The item is connected to the test machine, such as battery cycler, which is controlled by the software platform, control file generated by the software platform, or directly by a test engineer.

At this point, the item has an "On Test" status. Referring also to FIG. 44, metadata may be entered about the ongoing test, such as any reference calibration measurements 4400 taken during battery testing.

Figure 45:
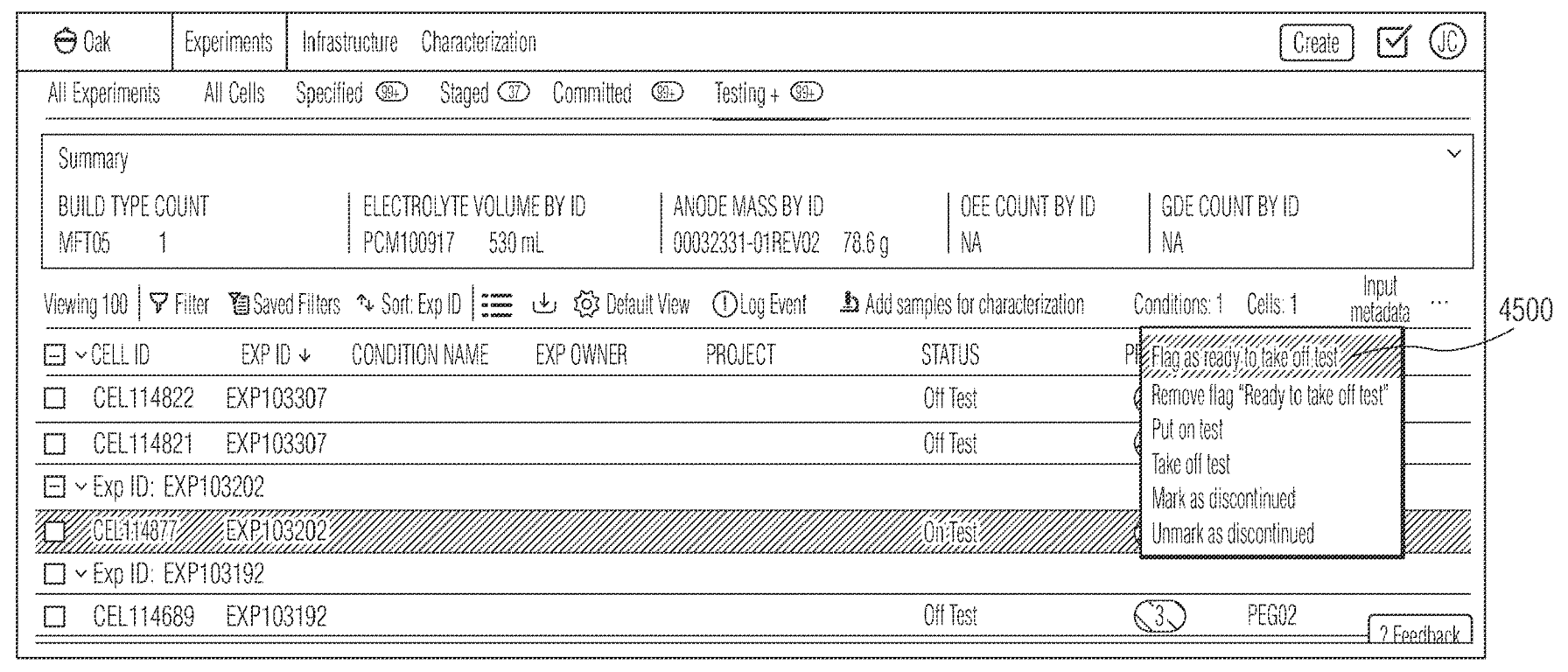

Referring also to FIG. 45, once a test is complete 362, technicians can mark the cell as ready to be taken off test such as by setting a flag 4500 within the software platform.

Once a technician is available and physically disconnects the item from its testing location, the item can be marked as off test. Referring also to FIG. 46, if this operation was completed by accident for any reason, there is also the option to undo 4600 the completion.

Referring also to FIG. 47, after the item has been removed, the software platform allows users to conduct a teardown 4700 analysis, which essentially means noting any physical observations on the item after the test is run.

Figure 48:
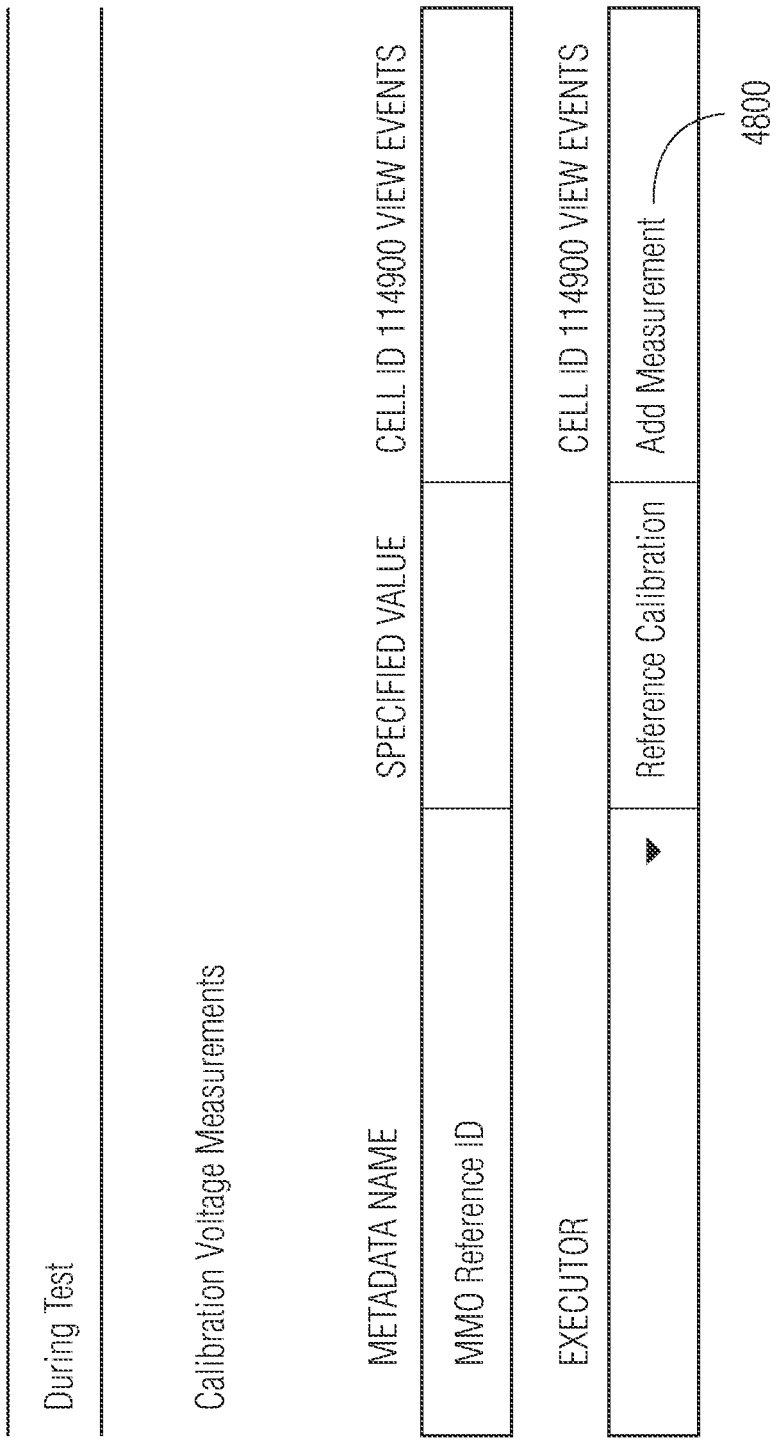
FIG. 48 illustrates a metadata entry interface with no prior measurements entered during test.
Figure 49:
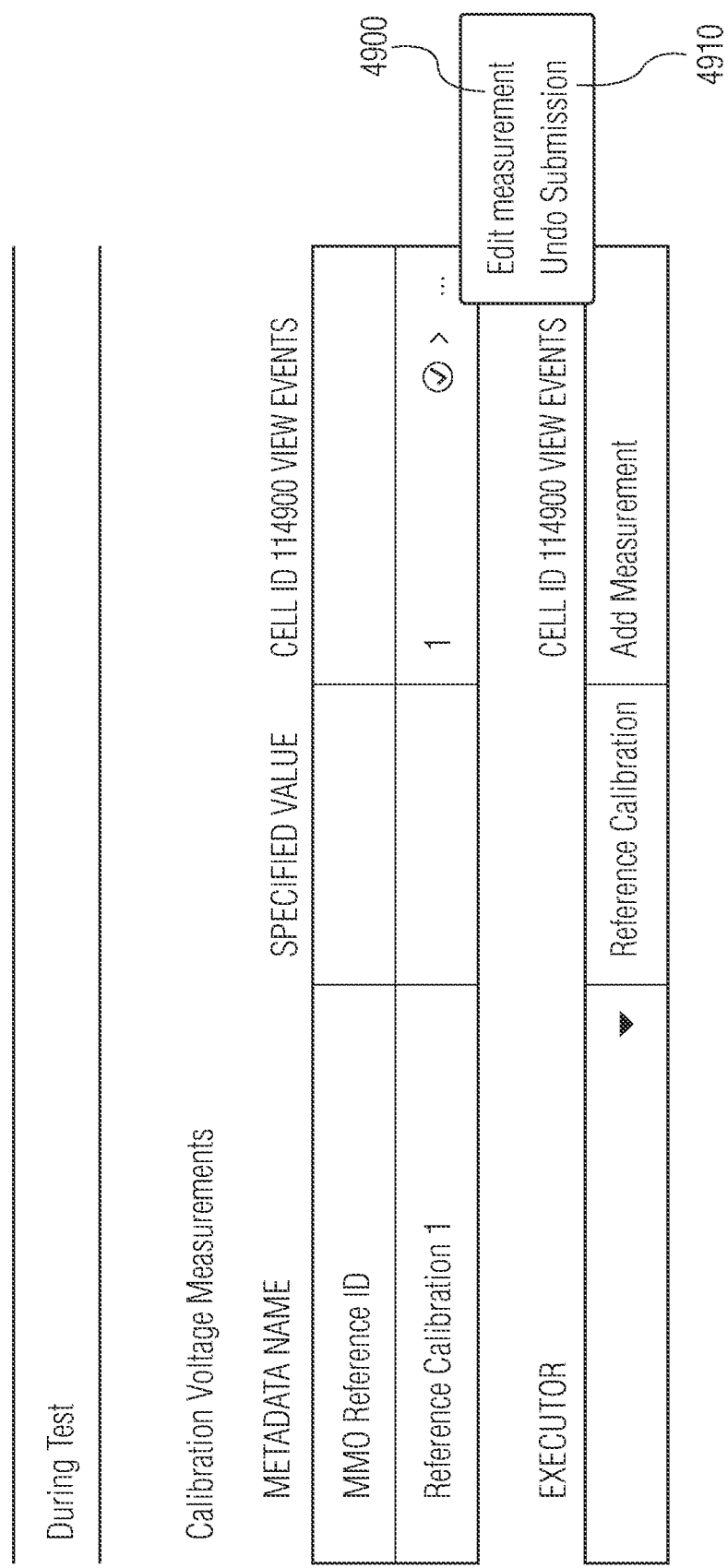
FIG. 49 illustrates the metadata entry interface with one prior measurement entered during test.

While a cell is being tested, users have the ability to capture reference calibration measurements, which can later be used against test data for context during data analysis. Referring also to FIG. 48, users can click an "Add Measurement" 4800 button from a metadata entry page, which prompts the user to fill out measurement data, such as calibration measurement, including reference electrodes, during battery testing. Referring also to FIG. 49, after data is entered it may display on the metadata entry page and can be edited 4900 or deleted altogether 4910.

Figure 50:
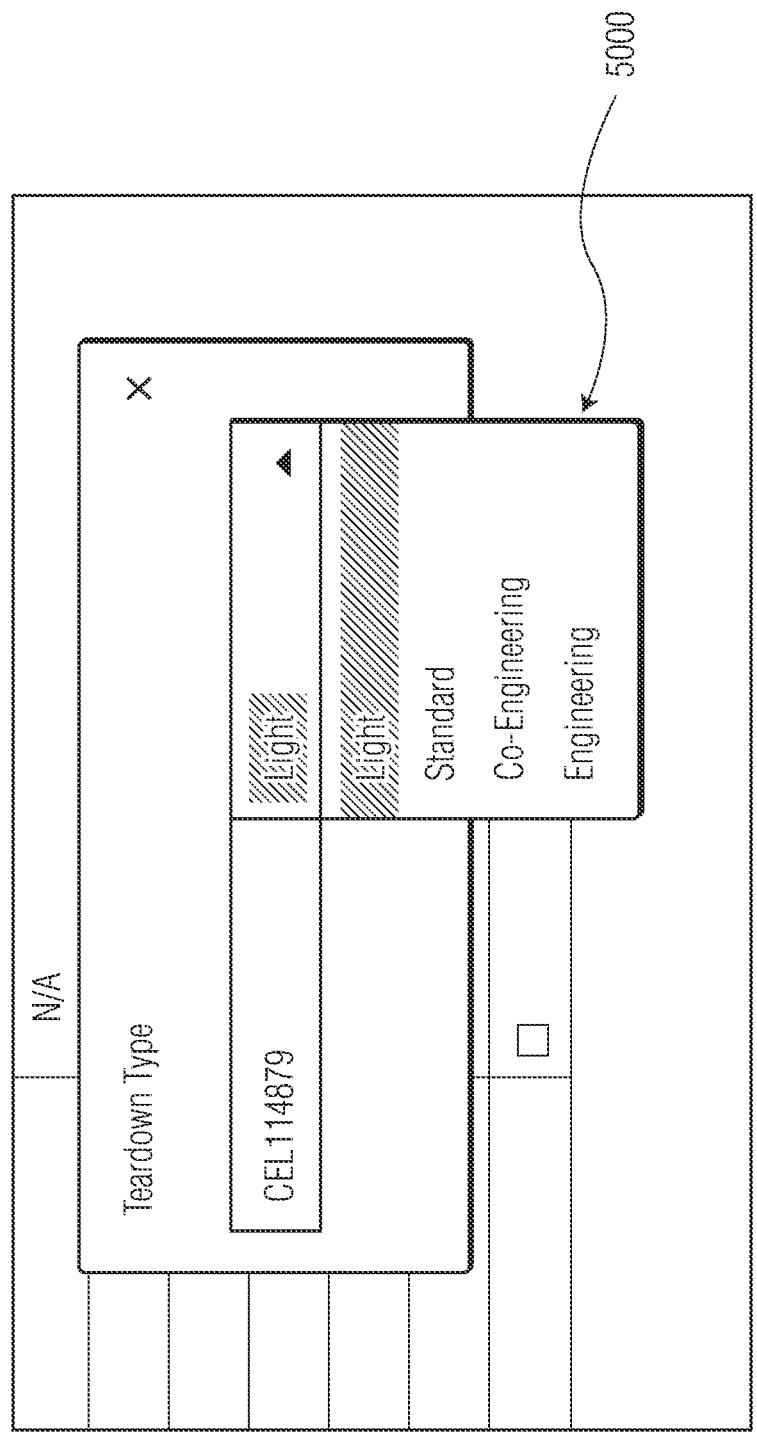
FIG. 50 illustrates an interface for selecting a specific teardown.

Experiment owners may be interested in an analysis of the physical attributes of the item after it's been through testing, known as the 'Teardown' 370 stage. Referring also to FIG. 50, experiment owners can define 348 the level of thoroughness of the analysis, or Teardown type, from a dropdown 5000 during experiment specification. The configuration of the fields displayed per teardown type and item type, and whether or not each field will be required, may be configured by templates such as a spreadsheet defining specific fields and requirements for the teardown and item, and loaded or otherwise input into the software platform. If a teardown configuration is updated for new item specifications, a prior configuration may be retained for previously-specified items. Referring also to FIG. 51, an experiment owner may also update 5100 the teardown configuration to the latest version.

Referring also to FIG. 52, at any point during the design, build, and testing process, users are able to log events 5200 that occur during an experiment lifecycle, to either the item or the test channel. Tracked event data includes the time and location of the event, as well as various metadata that may be entered to help understand anything that might have affected cell data.

A user logging an event may alert other users of the event through communications software such as email, and create a task for tracking status within the software platform or integrated project management tool such as Asana. These events may be directly linked to items, experiments, and test infrastructure. Referring also to FIG. 53, users can view a summary 5300 of events associated with each resource, as well as the status of each event. Once the event is marked as completed, the displayed status also displays as completed in the event summary.

Experiment owners and test teams may want to be notified when the on test experiments have reached termination conditions and are ready to come off test. This can be determined by comparing end-of-test parameters with monitored values of those parameters as tests progress. The end-of-test parameters may be specified by experiment owners among other test conditions, or automatically by application of default test protocols that describe termination conditions, and may be supplied to test machines controlling specific channels.

Other Embodiments

Figure 54:
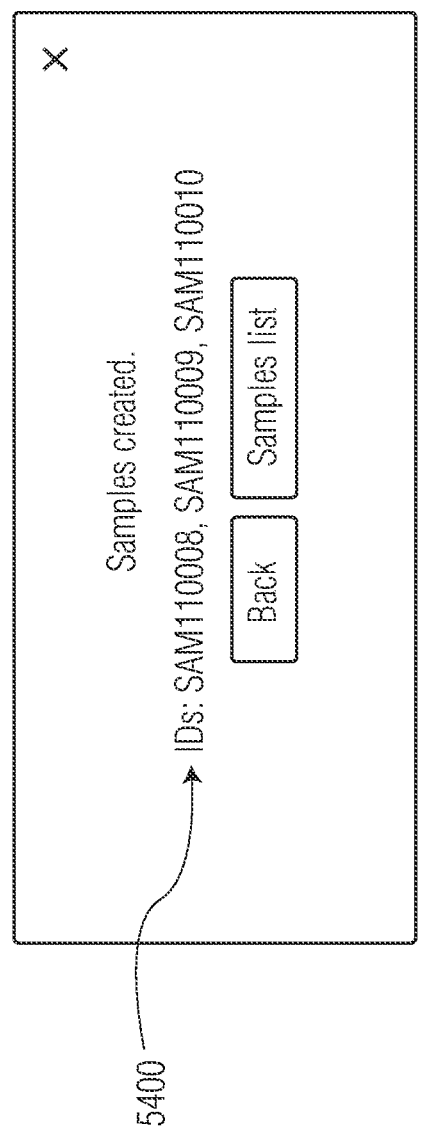
FIG. 54 illustrates an interface displaying creation of characterization samples.

In addition to a teardown type that experiment owners may specify, experiment owners may want special types of analysis done on materials of components after testing is complete, which is known as as characterization after battery cell testing. The software platform provides an interface to define which component(s) the experiment owners would like to perform characterization upon, as well as provide some other metadata about the component relevant to the characterization technique they would like performed. This creates a characterization sample record within the software platform. Referring also to FIG. 54, a characterization sample ID 5400 provided by the software platform is an identifier with which a teardown or characterization team can associate the data from any of their characterization techniques for downstream analysis, which then associates the sample with metadata entered into the software platform associated with the item, or any associated external testing data. If users want to create multiple characterization sample records, the software platform provides an interface to do so, especially for characterization samples that have the same value for many fields collection in a characterization sample creation form. Referring also to FIG. 55, users may select items for which they would like to create characterization samples from a list view, and access a form with a single column 5500 to enter shared data between the items. Referring also to FIG. 56, after entering shared data, users may view an interface displaying a column 5600A, 5600B, & 5600C for each item, where they can enter data unique to that item or characterization sample. Additionally, users can create characterization sample records for materials not associated with tested items, such as to to perform quality assurance on incoming material.

Figure 57:
FIG. 57 illustrates an interface to view, sort, and filter all characterization samples.

Referring also to FIG. 57, the characterization sample records 5700 created within the software platform may be viewed in a list format similar to the lists seen for experiments and testing channels, including search and filtering functionality.

As part of the testing process for batteries, cells and modules are connected to a battery cyclers that run custom testing protocols. The connections to the cycler vary per device under test, as well as per individual test. In order for battery scientists to be able to easily and accurately interpret the results every time, they may specify the configuration of the physical connections of the cell to the cycler, referred to as the signal map. To generate signal maps, users may choose from a number of pre-configured templates, or duplicate the configuration of a previous test. Within the software platform, they may add or edit new signals in bulk, as well as delete signals as necessary. A summary section of the existing configuration may be referenced without needing to go through all the listed signals. Once a configuration is fully specified, it may be translated into a signal map file and downloaded. In addition, once a test has been started on the site, a test script that tells the cycler what test functions to run may also be generated.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A method of large volume item design, building, and testing, comprising:
    inputting, into a user interface of a software platform, specifications of an long duration storage battery cell to build;
    inputting, into the user interface, conditions of a test to apply to the cell;
    verifying, by the software platform, that one or more required components are available to build one or more subassemblies of the cell;
    staging the required components;
    identifying, within the software platform, one or more matching channels from multiple channels across multiple battery cyclers, wherein the matching channels are capable of performing the input test conditions and not actively testing another item nor reserved for testing another item;
    reserving, within the user interface, one of the matching channels;
    committing the cell to be built after the required components are staged and the one of the matching channels is reserved;
    tracking, by the software platform, a build status for each of the one or more subassemblies;
    after completion of all of the one or more subassemblies, building the cell;
    connecting the cell to the reserved channel within a battery cycler;
    operating the battery cycler and testing the cell based on the input test conditions;
    taking reference calibrations, measuring reference electrode calibrations and recording the calibrations during the test to be used later against test data;
    disconnecting the cell after completion of the test;
    tearing down the cell to one or more components;
    tracking, through the software platform, metadata about the cell through specification, build, test, and teardown;
    tracking, through the software platform, metadata about one or more characterization samples taken during teardown;
    specifying, within the software platform, a number of replicates of the item;
    building the number of replicates of the item, each to the specifications of the item; and
    tracking separate metadata for each replicate item.

2. A method of large volume item design, building, and testing, comprising:
    inputting, into a user interface of a software platform, specifications of an item to build;
    inputting, into the user interface, conditions of a test to apply to the item;
    building the item;

reserving, within the user interface, one of multiple channels from thousands of channels across multiple test machines;
connecting the item to the reserved channel within a test machine;
operating the test machine and testing the item based on the input test conditions;
disconnecting the item after completion of the test;
tearing down the item to one or more components; and
tracking, through the software platform, metadata about the item through specification, build, test, and teardown.

3. The method of claim 2, wherein building the item further comprises:
verifying, by the software platform, that one or more required components are available to build one or more subassemblies of the item;
staging the required components;
committing the item to be built after the required components are staged and the one of multiple channels is reserved;
tracking, by the software platform, a build status for each of the one or more subassemblies; and
after completion of all of the one or more subassemblies, building the item.

4. The method of claim 3, further comprising:
receiving, through the software platform, a change request from a designer of the item;
notifying a supervising user involved with building the item about the change request;
determining, by the supervising user, that the change request is possible based on a current stage of the item and approving, within the software platform, the change request; and
wherein building the item further comprises building the item based on the specifications and change request.

5. The method of claim 2, further comprising:
specifying, within the software platform, a number of replicates of the item;
building the number of replicates of the item, each to the specifications of the item; and
tracking separate metadata for each replicate item.

6. The method of claim 2, further comprising:
identifying, within the software platform, one or more matching channels among the multiple channels, wherein the matching channels are capable of performing the input test conditions and not actively testing another item nor reserved for testing another item; and
wherein reserving one of multiple channels further comprises reserving one of the one or more matching channels.

7. The method of claim 2, further comprising:
displaying, within the user interface, one or more screens displaying tables of items or channels, wherein the tables are user configurable for which data fields display about the items or channels, and filterable and sortable based on the data fields displayed.

8. The method of claim 7, further comprising:
marking, within the software platform, indication that a non-standard deviation is required for the item;
entering, within the software platform, a description of the non-standard deviation; and
displaying, within a displayed screen including data fields about the item in a table, graphical indication that the non-standard deviation is required for the item.

9. The method of claim 2, further comprising selecting, within the user interface, a teardown type along with inputting specifications of the item.

10. The method of claim 9, further comprising modifying a template specifying details of the teardown type.

11. The method of claim 10, further comprising updating, after the teardown type template is modified, the selected teardown type to the modified version.

12. The method of claim 2, further comprising maintaining, within the software platform, an On Test status for the item after beginning testing.

13. The method of claim 12, further comprising:
monitoring, within the test machine, one or more parameters related to the item during; and
when the monitored one or more parameters match one or more end-of-test parameters, flagging, within the software platform, the item as ready to take off test.

14. The method of claim 13, further comprising after disconnecting the item, updating the status of the item to Off Test.

15. The method of claim 2, further comprising setting, within the software platform, a priority for the test item before it is built.

16. The method of claim 2, further comprising:
logging an event occurring during the design, building, or testing stages of an item, and
tracking the logged event associated with the item and any related testing infrastructure.

17. The method of claim 2, wherein the item is a long duration storage battery cell, and the multiple test machines are battery cyclers.

18. The method of claim 17, further comprising identifying, within the software platform, one or more components of the cell for post-test characterization.

19. The method of claim 18, further comprising entering, within a combined data entry field in the user interface, sample characterization data that applies to multiple samples.

20. The method of claim 19, further comprising entering, within a data entry table within the user interface displaying entries fields for the multiple samples, sample characterization data that applies to only one of the multiple samples.

* * * * *